United States Patent
Itoh

(10) Patent No.: US 8,159,758 B2
(45) Date of Patent: Apr. 17, 2012

(54) ZOOM LENS SYSTEM AND IMAGE PICKUP APPARATUS HAVING SAME

(75) Inventor: Yoshinori Itoh, Shimotsuke (JP)

(73) Assignee: Canon Kabushiki Kaisha, Tokyo (JP)

( * ) Notice: Subject to any disclaimer, the term of this patent is extended or adjusted under 35 U.S.C. 154(b) by 9 days.

(21) Appl. No.: 12/943,869

(22) Filed: Nov. 10, 2010

(65) Prior Publication Data

US 2011/0116173 A1    May 19, 2011

(30) Foreign Application Priority Data

Nov. 16, 2009  (JP) .................................. 2009-260831

(51) Int. Cl.
*G02B 15/14* (2006.01)

(52) U.S. Cl. ...................................................... 359/687
(58) Field of Classification Search .................. 359/676, 359/683, 687
See application file for complete search history.

(56) References Cited

U.S. PATENT DOCUMENTS

| 7,719,774 | B2 | 5/2010 | Satori et al. | |
| 2003/0081323 | A1* | 5/2003 | Horiuchi | 359/687 |
| 2007/0279763 | A1* | 12/2007 | Hoshi | 359/687 |

* cited by examiner

*Primary Examiner* — Scott J Sugarman
(74) *Attorney, Agent, or Firm* — Canon U.S.A., Inc. IP Division

(57) ABSTRACT

A zoom lens system includes, in order from the object side to the image side, first, second, third, fourth lens units respectively having positive, negative, positive, and positive refractive powers. The lens units move from a wide-angle end to a telephoto end such that intervals between adjacent lens units vary during zooming. The first lens unit consists of first-a and first-b lens elements respectively having negative and positive refractive powers, and the second lens unit consists of second-a, second-b, and second-c lens elements respectively having negative, negative, and positive refractive powers. n12 and v12 respectively represent the refractive index and the Abbe number of the first-b lens element, and fw and ft respectively present the focal length at the wide-angle end and the telephoto end of the zoom lens system. Values for at least n12, v12, fw and ft are appropriately set based on predetermined conditions.

7 Claims, 18 Drawing Sheets

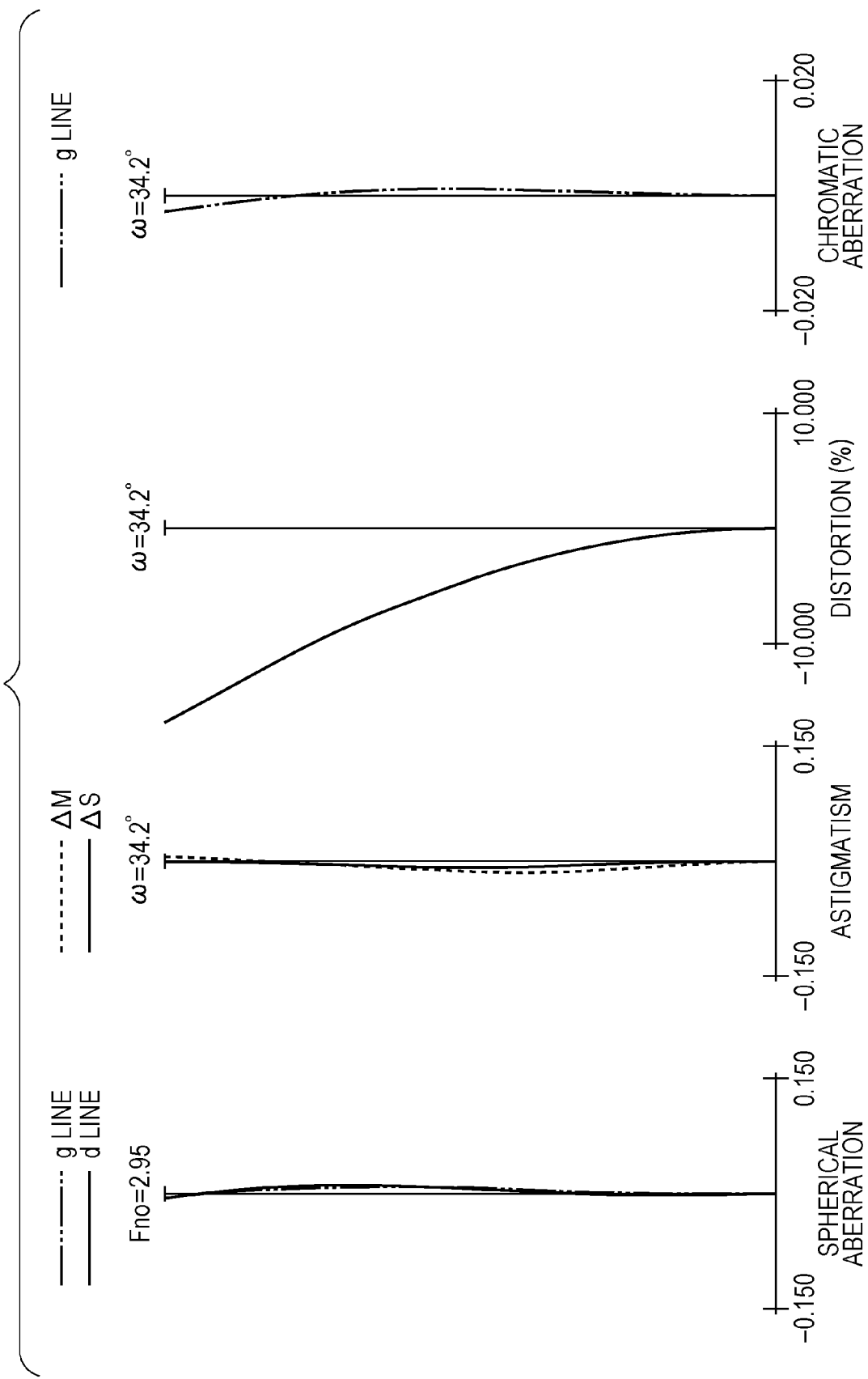

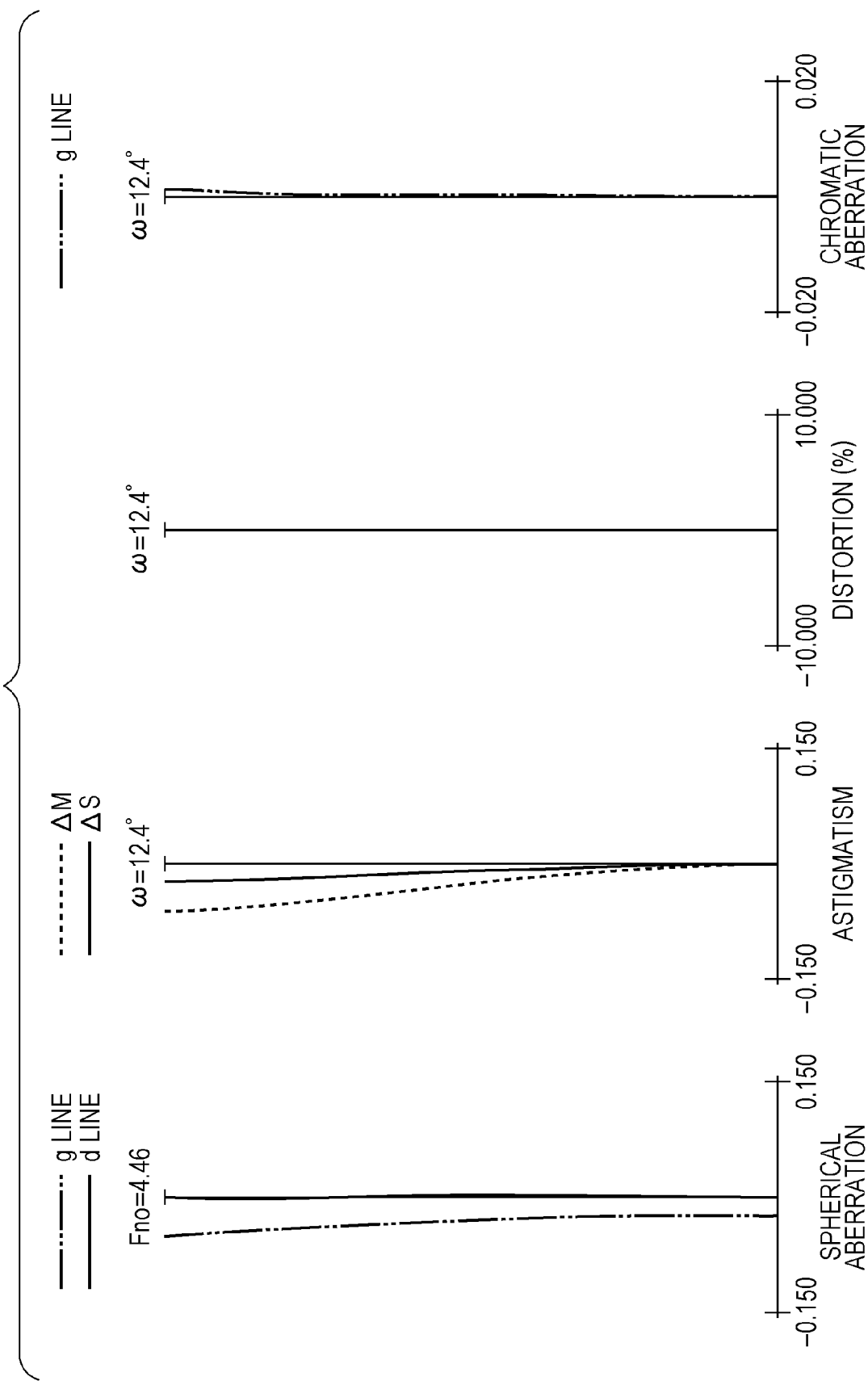

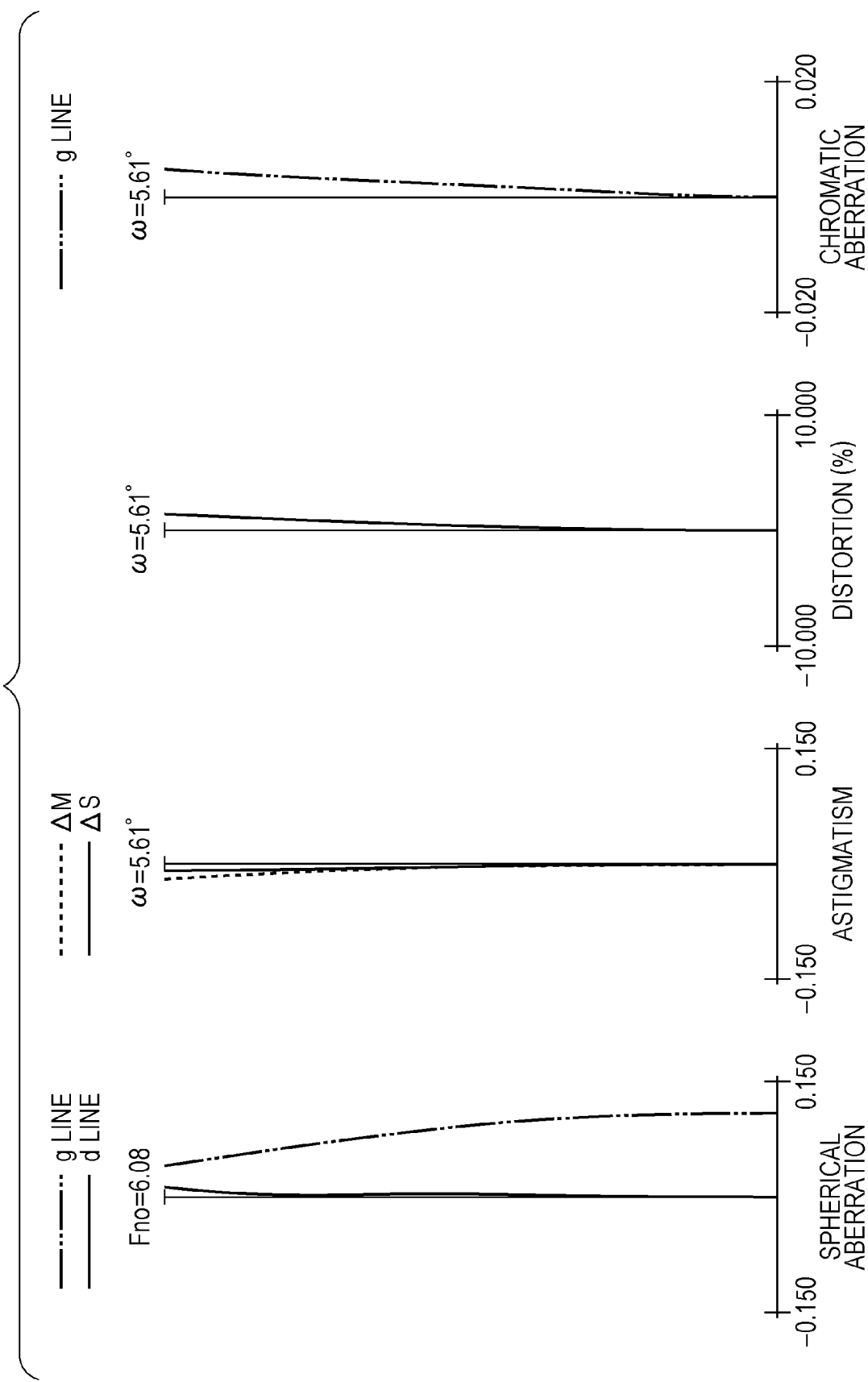

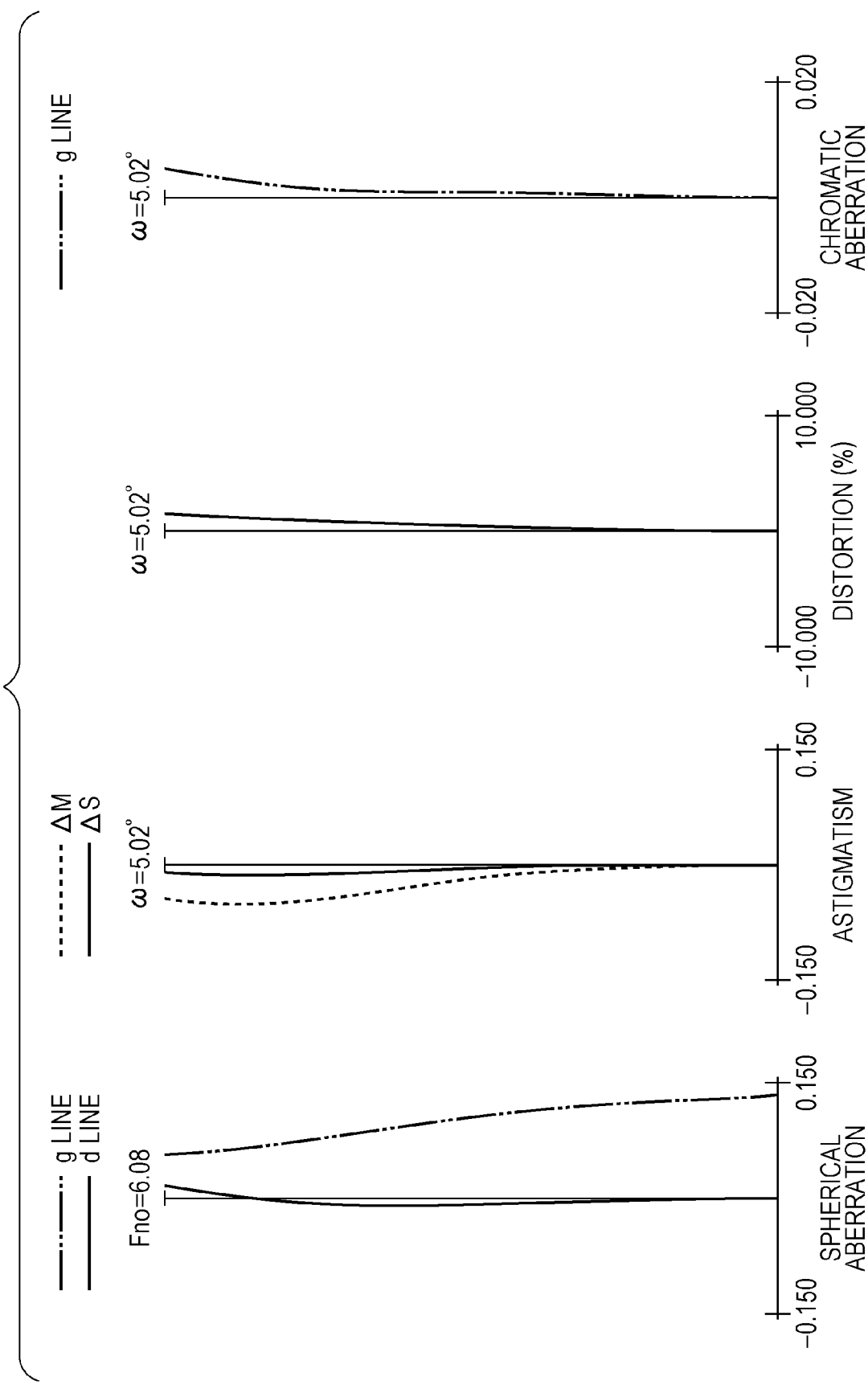

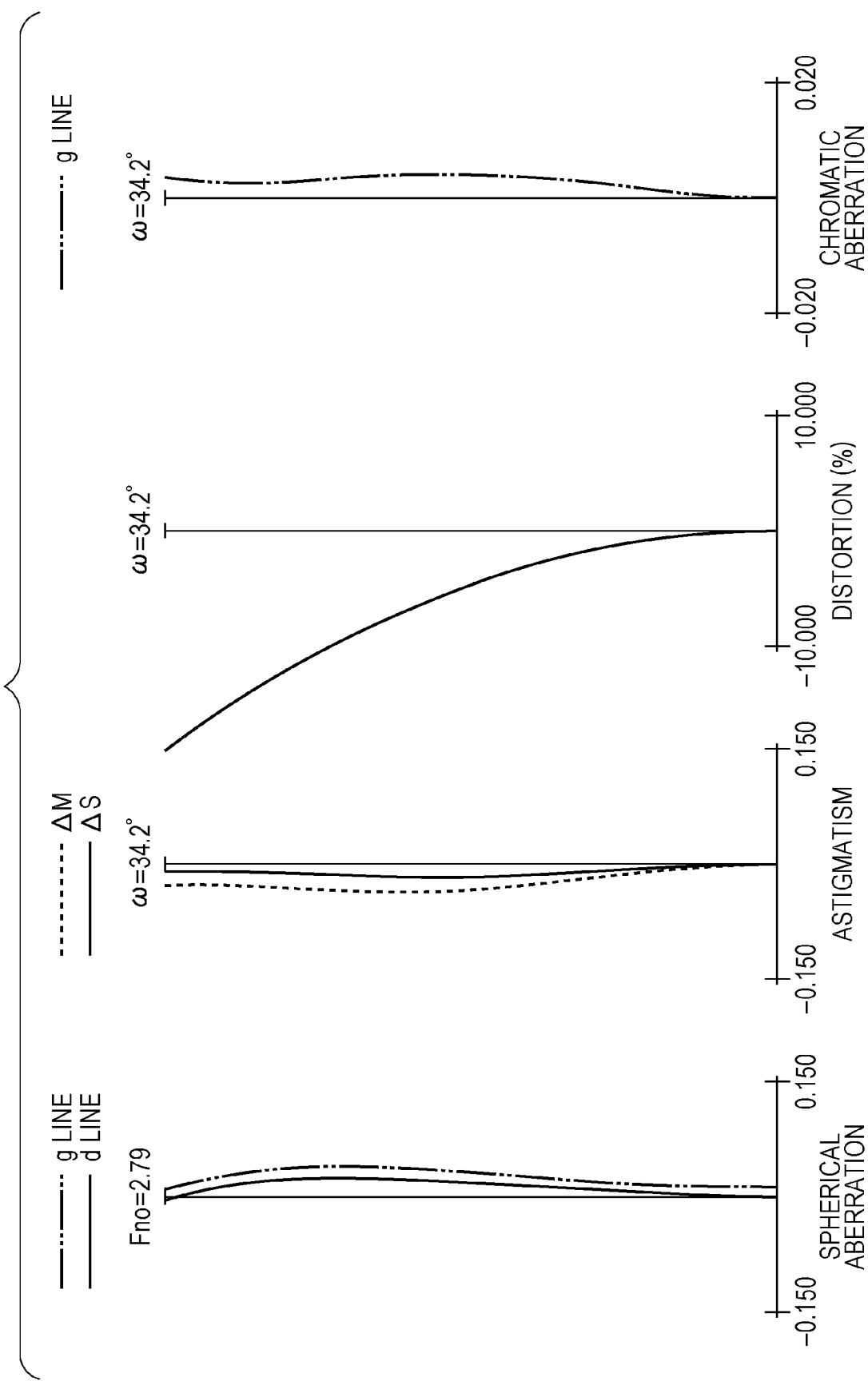

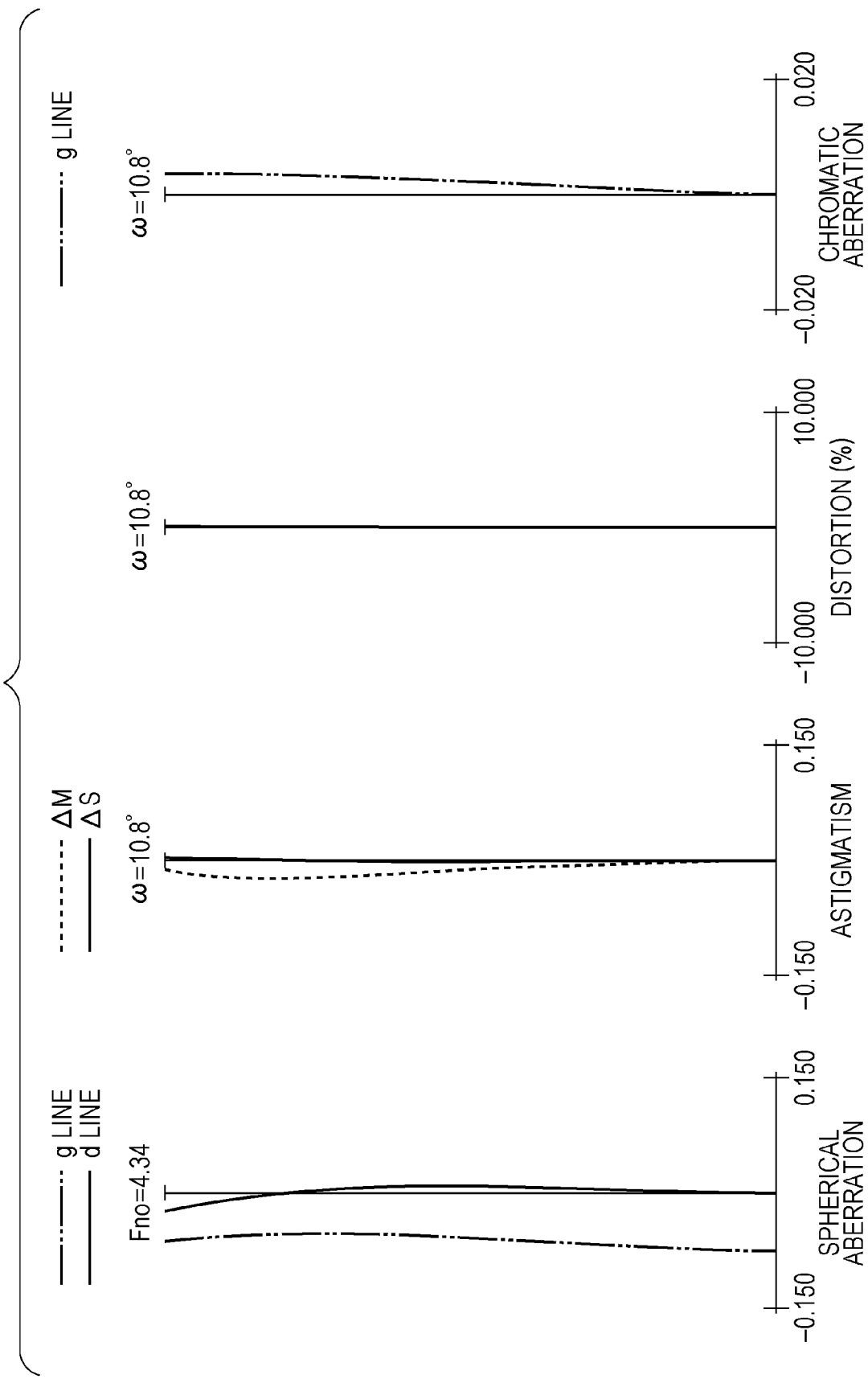

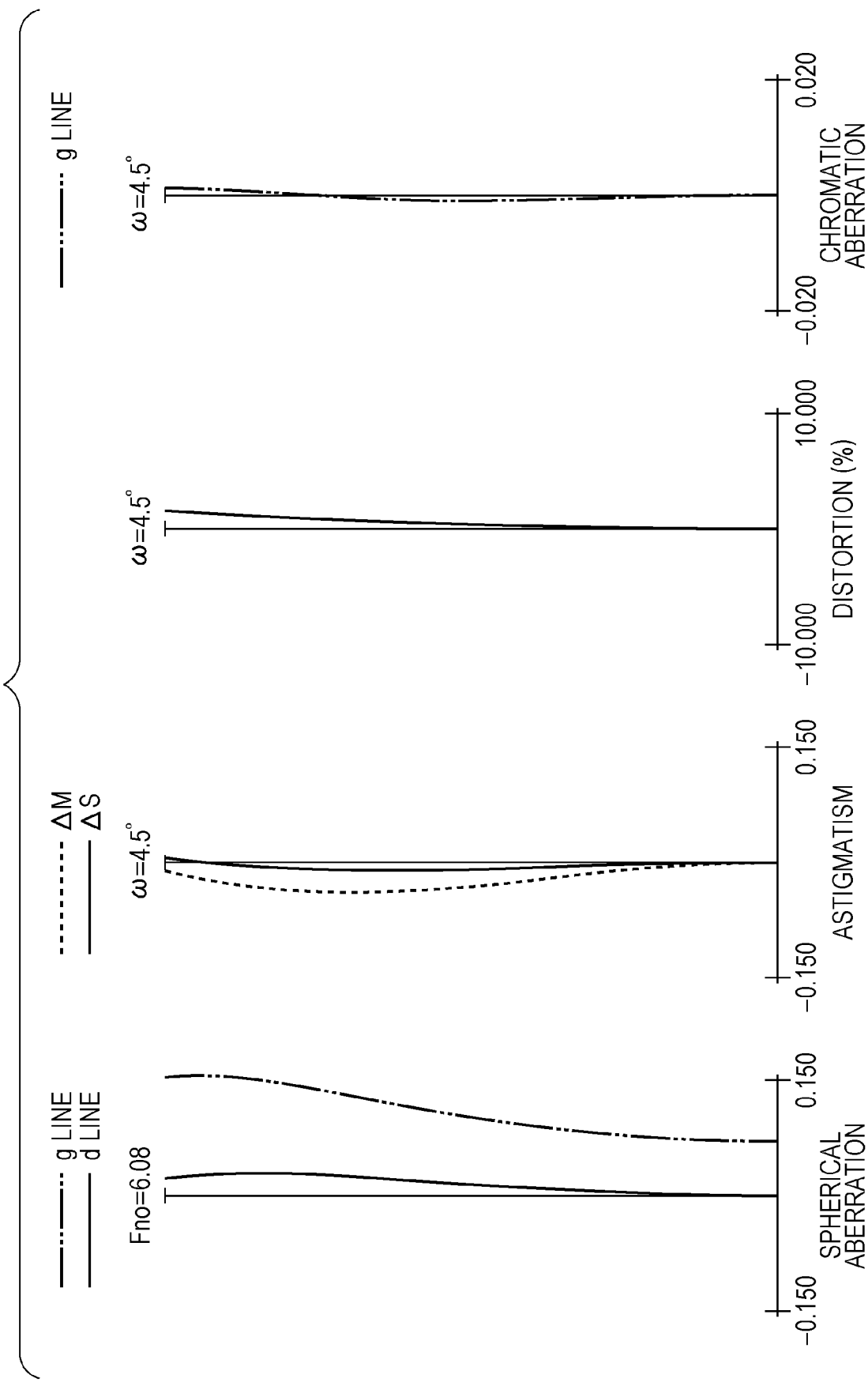

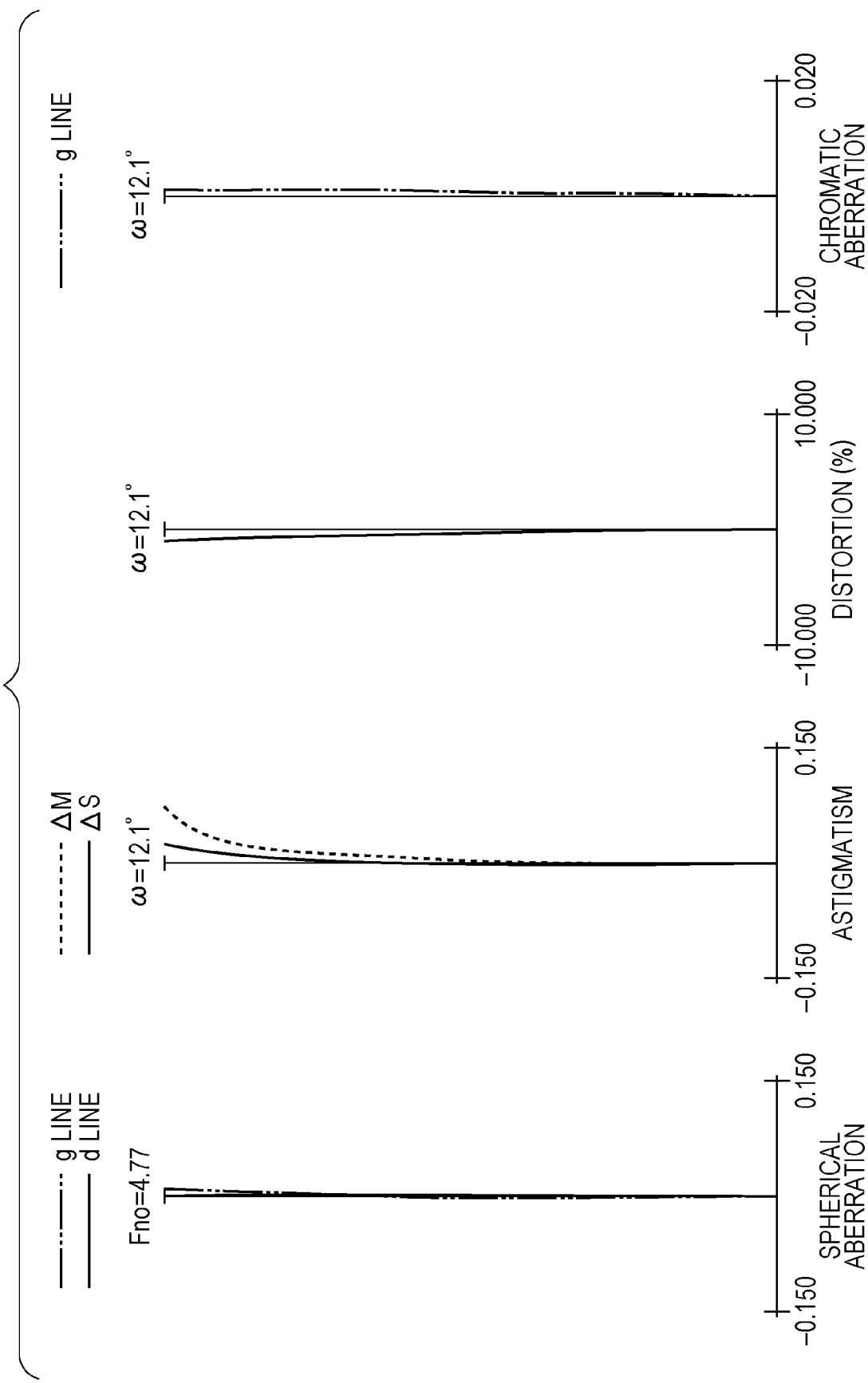

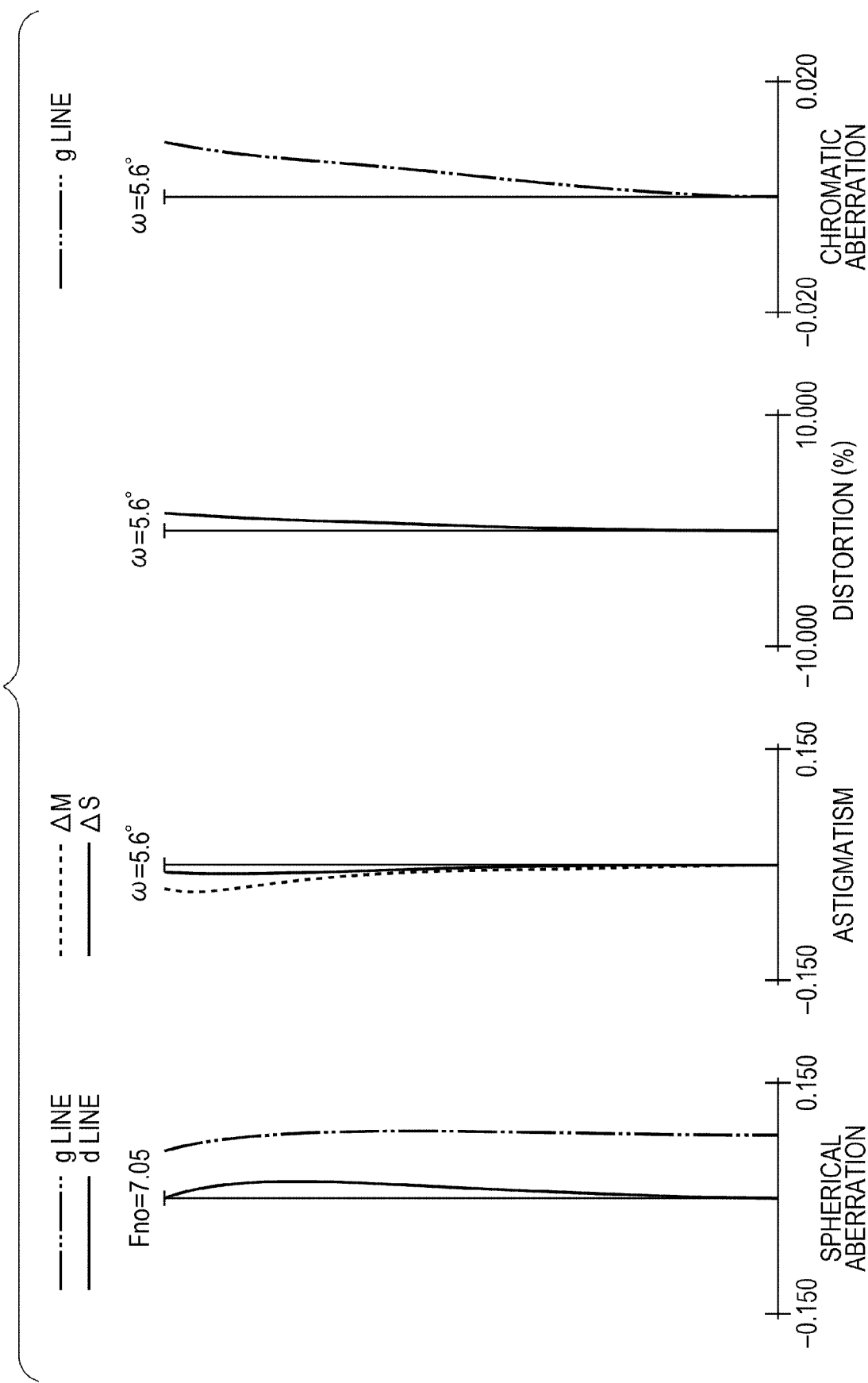

ZOOM LENS SYSTEM AND IMAGE PICKUP APPARATUS HAVING SAME

BACKGROUND OF THE INVENTION

1. Field of the Invention

The present invention relates to a zoom lens system and an image pickup apparatus having the zoom lens system, which are suitable for, for example, video cameras, electronic still cameras, and TV cameras (cameras for broadcasting).

2. Description of the Related Art

Today, image pickup apparatuses, such as video cameras, digital still cameras, cameras for broadcasting, and cameras using silver-halide film are sophisticated and are reduced in size. Image-pickup optical systems, such as a zoom lens, used in such cameras should be therefore compact in size and highly efficient. In other words, a compact zoom lens system having a small total length with a large zoom ratio and high resolution is required. Furthermore, there is demand for a retractable zoom lens system in which, when image pickup is not carried out (when not used), the lengths of the intervals between the lens units are set smaller than the lengths in an image pickup state. In this manner, the thickness (i.e., the length in the direction of the optical axis) of the entire image pickup apparatus is decreased.

A four-lens-unit zoom lens system, known to satisfy at least some of the above demands, includes four lens units having positive, negative, positive, and positive refractive powers, in this order from the object side to the image side of an imaging apparatus, and carries out zooming by moving each of these lens units. U.S. Pat. No. 7,719,774 (U.S. Pat. No. '774) describes an example of the four-lens-unit zoom lens system. In U.S. Pat. No. '774, the four-lens-unit zoom lens system includes two lens elements (a first lens unit that consists of one negative lens element and two positive lens elements) and a second lens unit that consists of three lens elements (negative, negative, and positive lens elements disposed in this order).

In general, when the number of lens elements in a lens unit constituting a zoom lens system is large, the length along the optical axis of the lens unit increases. Moreover, when the displacement of the lens units is large during zooming and focusing, the total length of the lens system increases. As a result, the retracted length increases, making the lens system less suitable for a retractable zoom lens system. With a zoom lens system used in an image pickup apparatus, it is important that the size of the entire lens system be reduced while achieving a desired zoom ratio and maintaining optimum optical performance in all zoom ranges. To achieve this, it is necessary to appropriately set the movement conditions of the lens units for zooming, the refractive power of the lens units, and the lens configuration of the lens units.

For example, reducing the size of the entire system while maintaining a desired zoom ratio can be achieved by increasing the refractive powers of the lens units in the zoom lens system. However, with such a zoom lens system, the variation in aberration as a result of zooming becomes large, and it becomes difficult to achieve optimum optical performance in all zoom ranges. In the above-described four-lens-unit zoom lens system, to acquire a large zoom ratio and a small-sized lens system while achieving optimum optical performance, it is important to appropriately set the refractive powers of the lens units, the lens configurations, and the movement conditions of the lens units for zooming. In particular, it is important to appropriately set the lens configuration of the first lens unit. Without such appropriate configurations, it is extremely difficult to acquire a zoom lens system suitable for a retractable structure having a large zoom ratio and excellent optical performance in all zoom ranges.

SUMMARY OF THE INVENTION

A zoom lens system according to the present invention includes a first lens unit having a positive refractive power; a second lens unit having a negative refractive power; a third lens unit having a positive refractive power; and a fourth lens unit having a positive refractive power. The first, second, third, and fourth lens units are arranged along an optical axis in order from the object side to the image side; and the lens units move along the optical axis such that intervals between adjacent lens units change during zooming. The first lens unit consists of a first-a lens element having a negative power and a first-b lens element having a positive refractive power, and the second lens unit consists of a second-a lens element having a negative refractive power, a second-b lens element having a negative refractive power, and a second-c lens element having a positive refractive power. The following conditional expressions: $7.5 < \sqrt{ft/fw} < 13.0$, $n12 > -0.0013\nu12 + 1.63$, and $\nu12 > 65$ are satisfied, where $n12$ and $\nu12$ respectively represent the refractive index and the Abbe number of the first-b lens element, and $fw$ and $ft$ respectively present the focal length at the wide-angle end and the telephoto end of the zoom lens system.

According to the present invention, a zoom lens system having excellent optical performance in all zoom ranges from the wide-angle end to the telephoto end is achieved.

Further features of the present invention will become apparent from the following description of exemplary embodiments with reference to the attached drawings.

BRIEF DESCRIPTION OF THE DRAWINGS

FIG. 2 is an aberration diagram for the first embodiment of the present invention.

FIG. 6 is an aberration diagram for the third embodiment of the present invention.

DESCRIPTION OF THE EMBODIMENTS

First Embodiment

Zoom lens systems according to embodiments of the present invention and an image pickup apparatus having such a zoom lens system will be described below. A zoom lens system according to the present invention includes, in order from the object side to the image side, a first lens unit having a positive refractive power, a second lens unit having a negative refractive power, a third lens unit having a positive refractive power, and a fourth lens unit having a positive refractive power. Zooming is carried out by moving the lens units such that, at the telephoto end in comparison with the wide-angle end, the interval between the first lens unit and the second lens unit is large, the interval between the second lens unit and the third lens unit is small, and the interval between the third lens unit and the fourth lens unit is large. In other words, zooming is carried out by varying the intervals between the lens units.

Figure 1A:
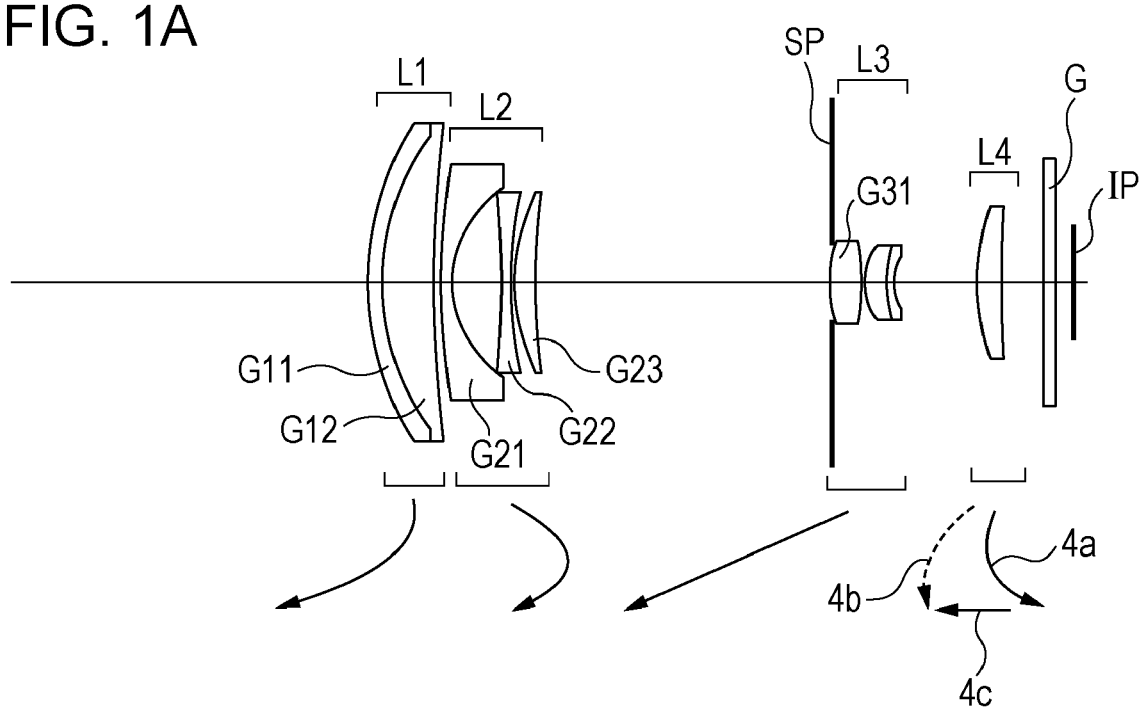
FIG. 1 is a sectional view of a lens system according to a first embodiment of the present invention.
Figure 1B:
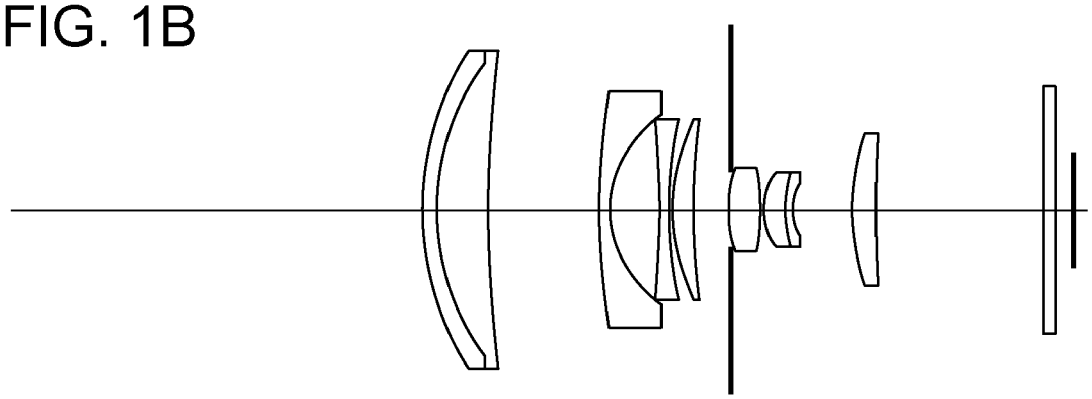
Figure 1C:
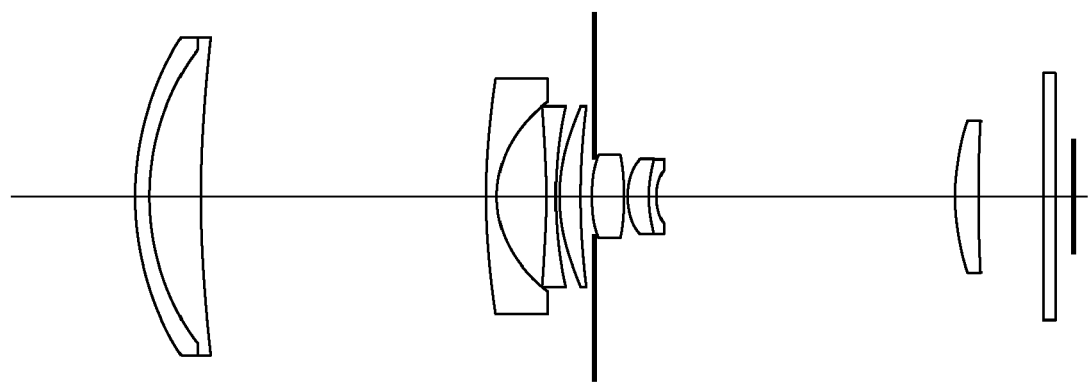
Figure 3A:
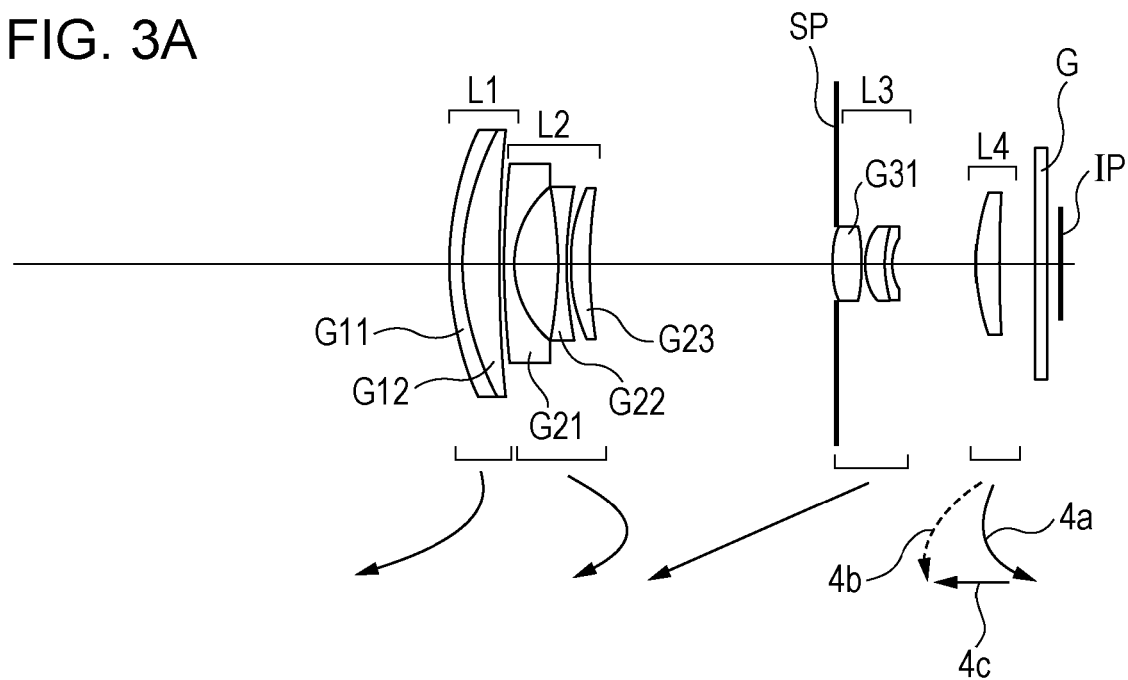
FIG. 3 is a sectional view of a lens system according to a second embodiment of the present invention.
Figure 3B:
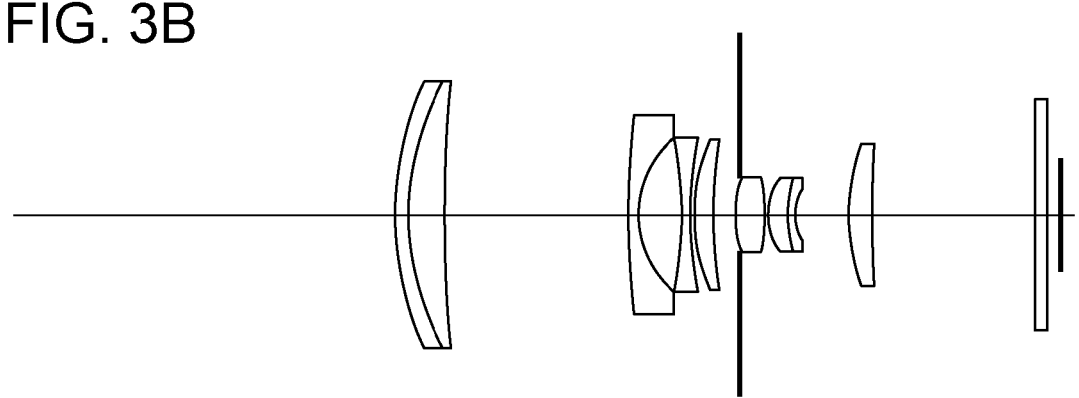
Figure 3C:
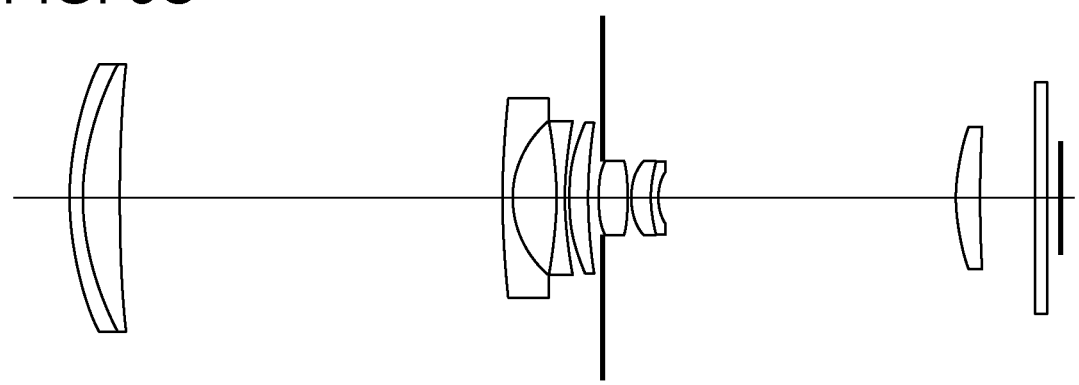
Figure 4A:
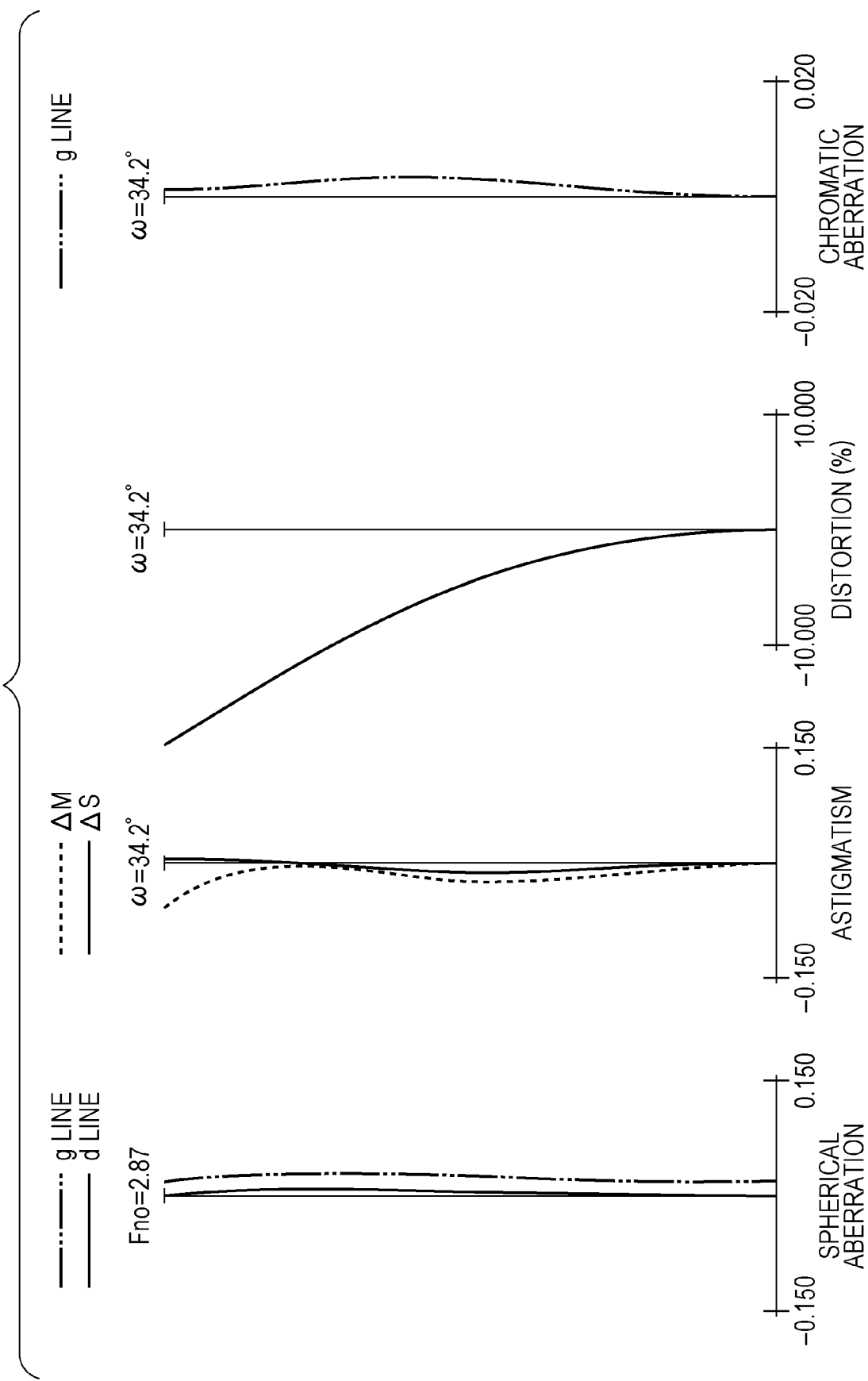
FIG. 4 is an aberration diagram for the second embodiment of the present invention.
Figure 4B:
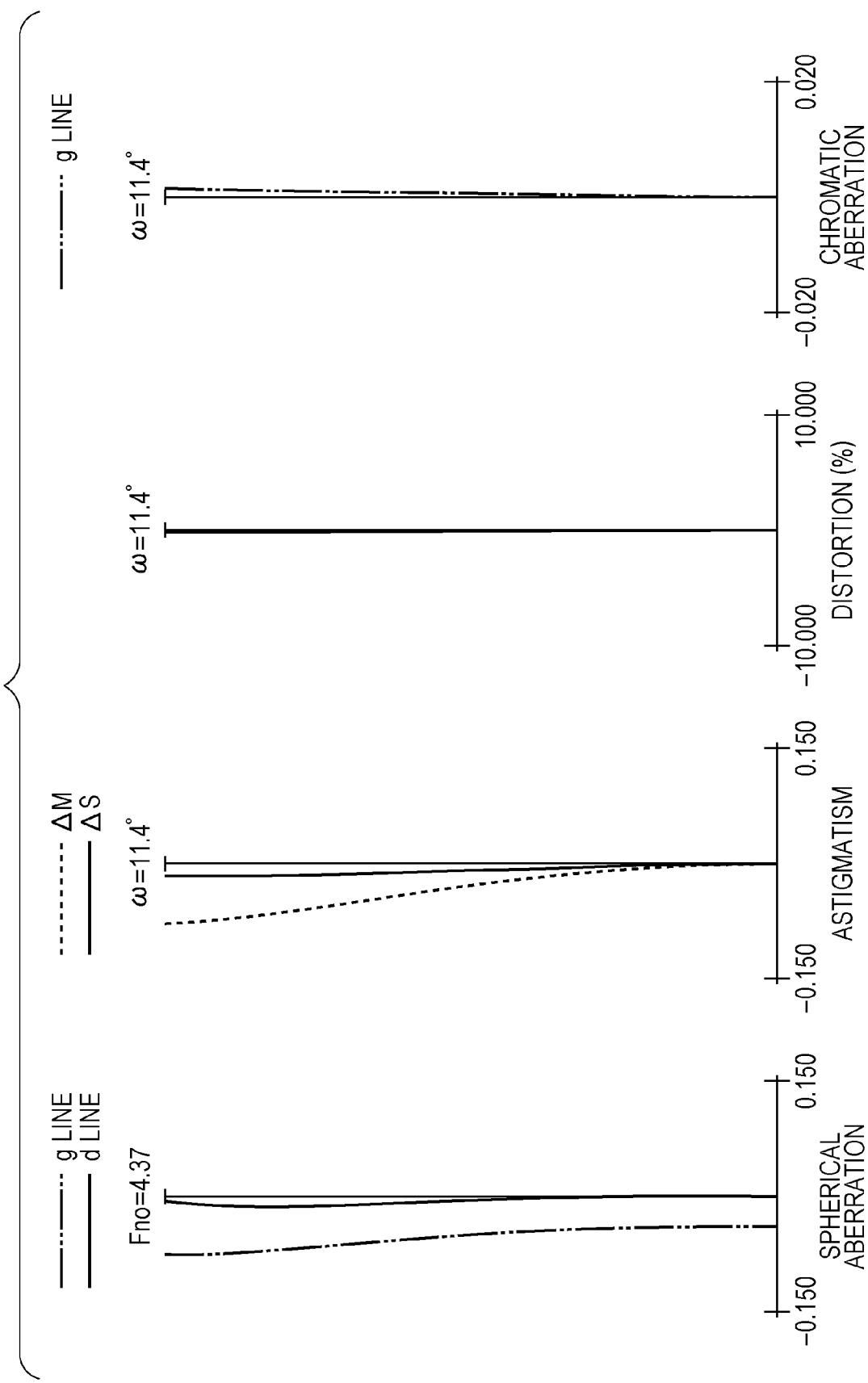

FIGS. 1A, 1B, and 1C are sectional views of the zoom lens system at a wide-angle end (short focal-length end), an intermediate zooming position, and a telephoto end (long focal-length end), respectively, according to a first embodiment of the present invention. FIGS. 2A, 2B, and 2C are aberration diagrams at the wide-angle end, the intermediate zooming position, and the telephoto end, respectively, of the zoom lens system according to the first embodiment. The zoom lens system according to the first embodiment has a zoom ratio of 7.71 and an F-number of 2.95 to 6.08. FIGS. 3A, 3B, and 3C are sectional views of the zoom lens system at a wide-angle end, an intermediate zooming position, and a telephoto end, respectively, according to a second embodiment of the present invention. FIGS. 4A, 4B, and 4C are aberration diagrams at the wide-angle end, the intermediate zooming position, and the telephoto end, respectively, of the zoom lens system according to the second embodiment. The zoom lens system according to the second embodiment has a zoom ratio of 8.62 and an F-number of 2.87 to 6.08.

Figure 5A:
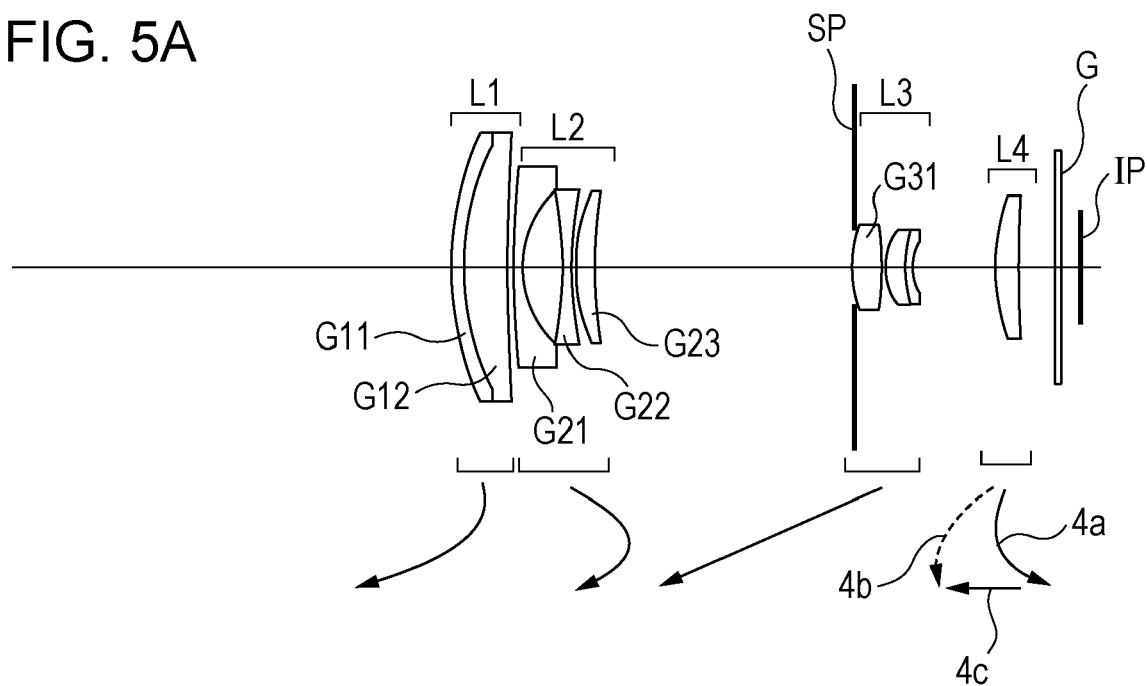
FIG. 5 is a sectional view of a lens system according to a third embodiment of the present invention.
Figure 5B:
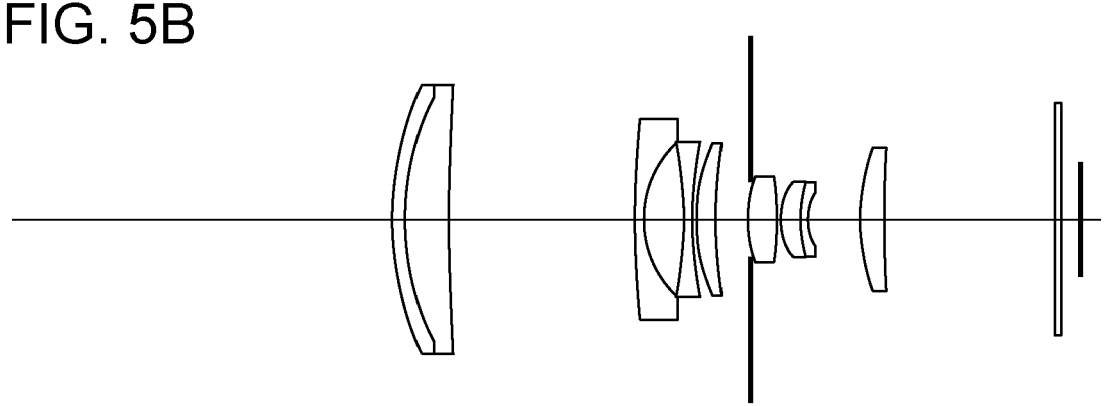
Figure 5C:
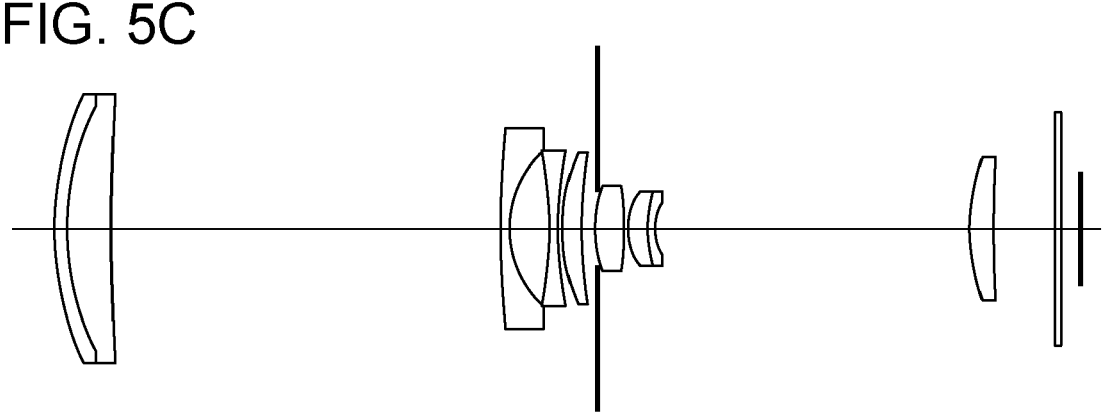
Figure 7A:
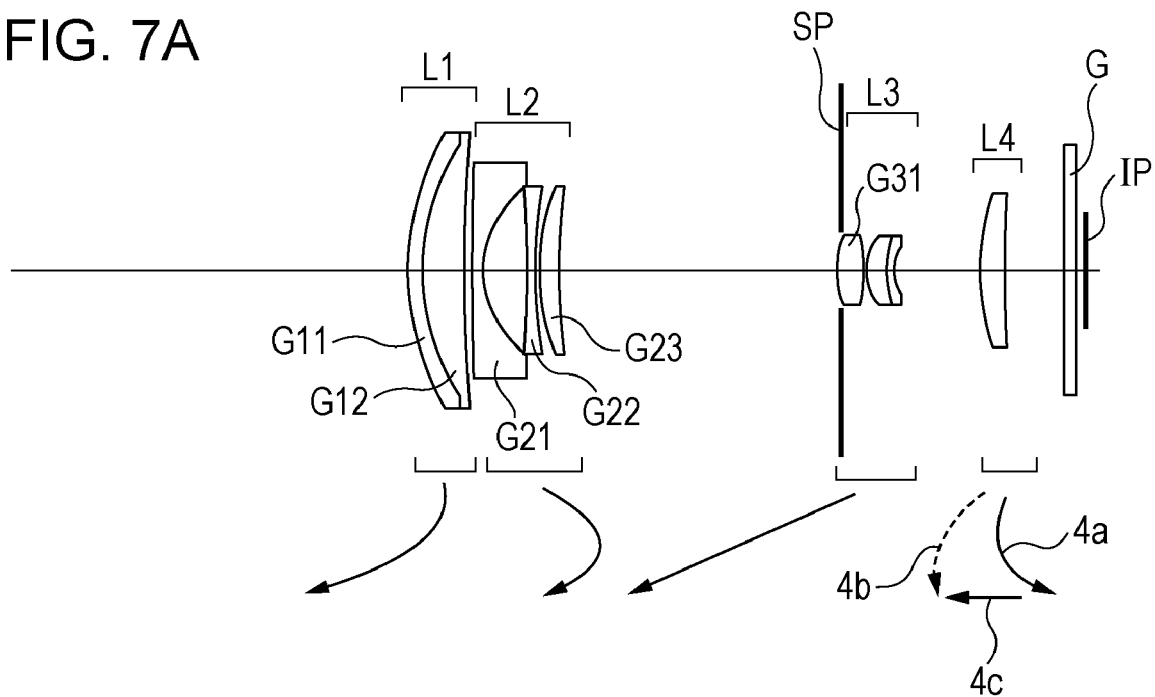
FIG. 7 is a sectional view of a lens system according to a fourth embodiment of the present invention.
Figure 7B:
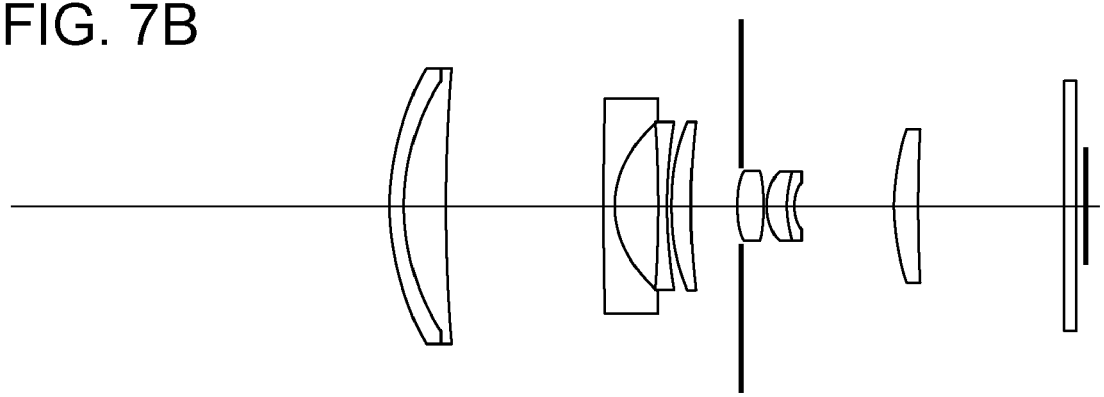
Figure 7C:
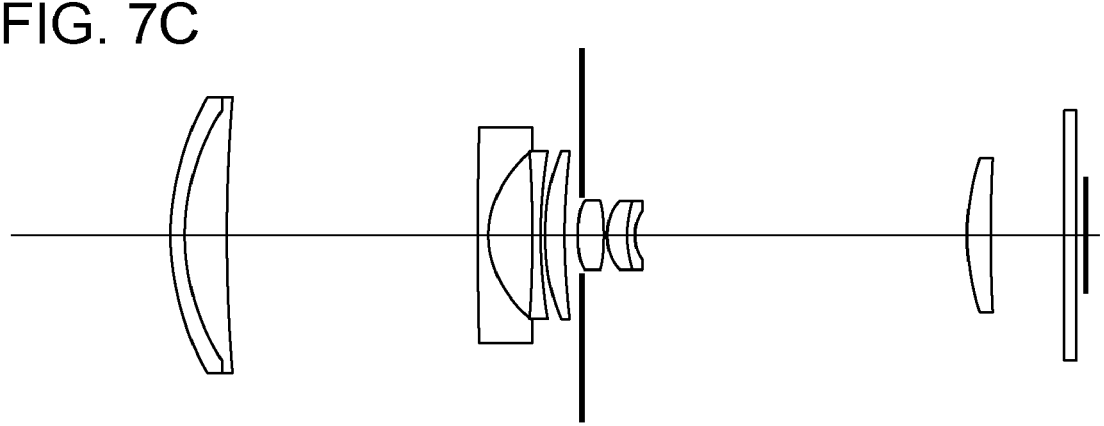
Figure 8A:
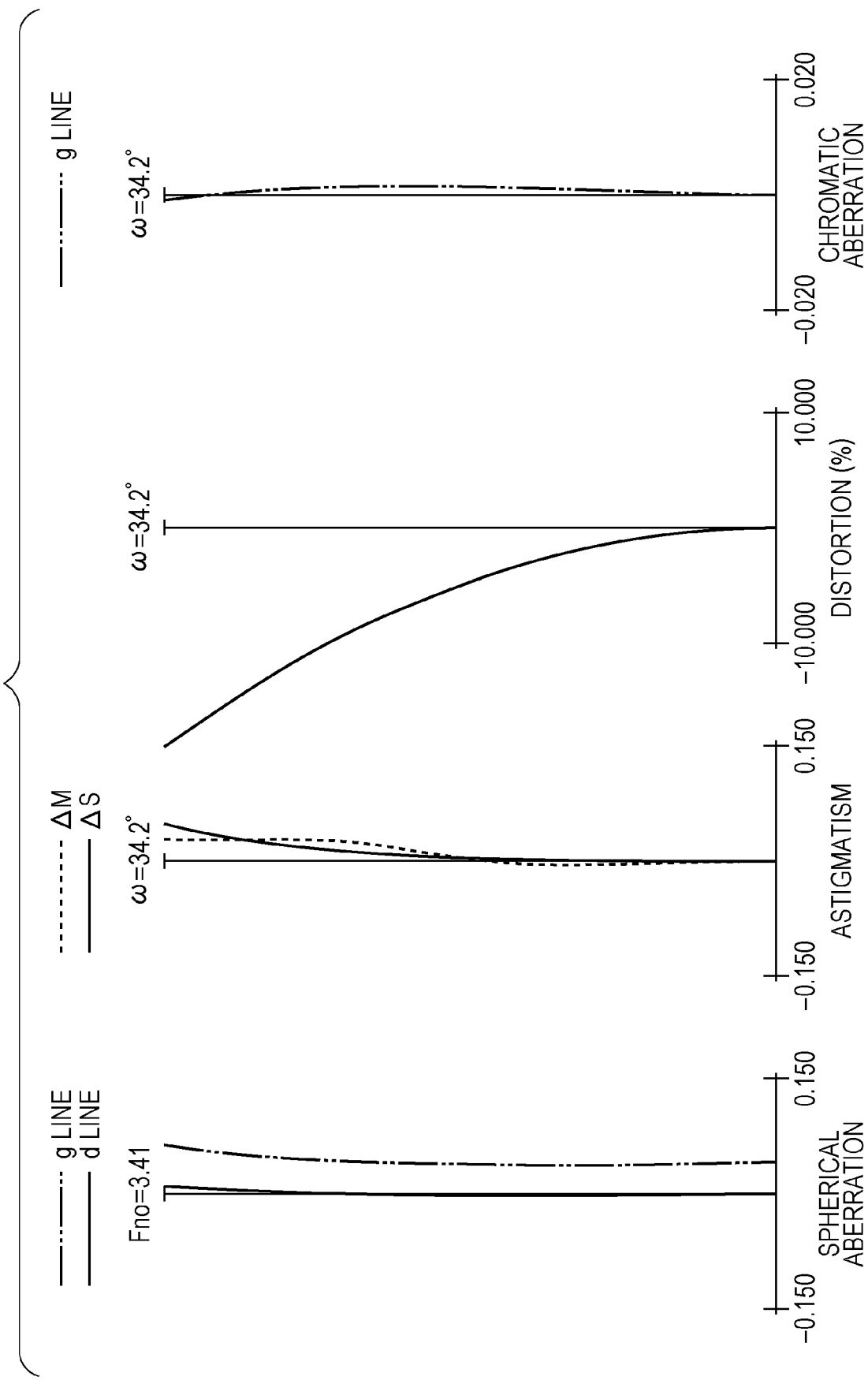
FIG. 8 is an aberration diagram for the fourth embodiment of the present invention.

FIGS. 5A, 5B, and 5C sectional views of the zoom lens system at a wide-angle end, an intermediate zooming position, and a telephoto end, respectively, according to a third embodiment of the present invention. FIGS. 6A, 6B, and 6C are aberration diagrams at the wide-angle end, the intermediate zooming position, and the telephoto end, respectively, of the zoom lens system according to the third embodiment. The zoom lens system according to the third embodiment has a zoom ratio of 9.60 and an F-number of 2.79 to 6.08. FIGS. 7A, 7B, and 7C sectional views of the zoom lens system at a wide-angle end, an intermediate zooming position, and a telephoto end, respectively, according to a fourth embodiment of the present invention. FIGS. 8A, 8B, and 8C are aberration diagrams at the wide-angle end, the intermediate zooming position, and the telephoto end, respectively, of the zoom lens system according to the fourth embodiment. The zoom lens system according to the fourth embodiment has a zoom ratio of 7.71 and an F-number of 3.41 to 7.05.

Figure 9:
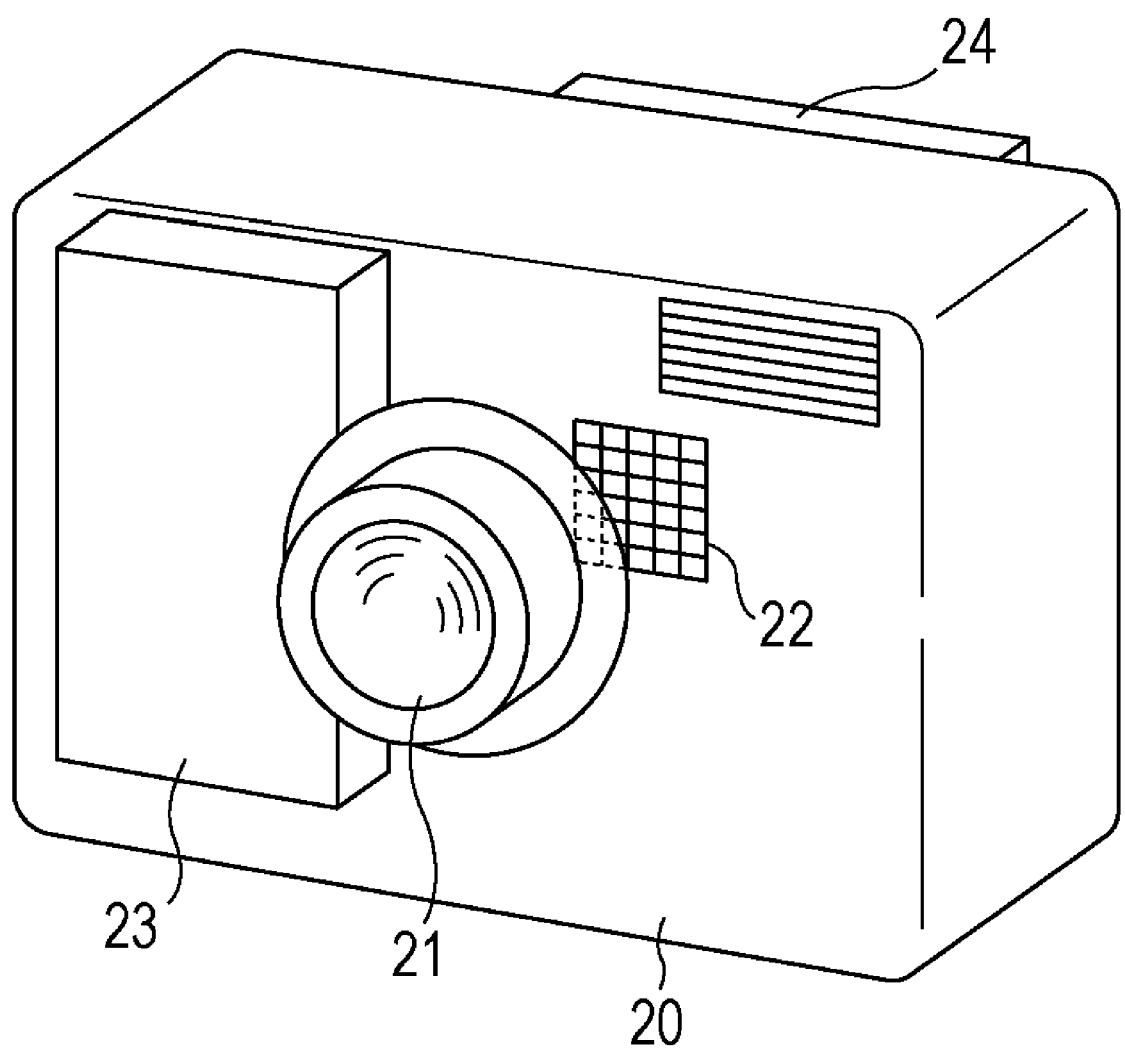
FIG. 9 is a schematic view of an image pickup apparatus according to the present invention.
Figure 10B:
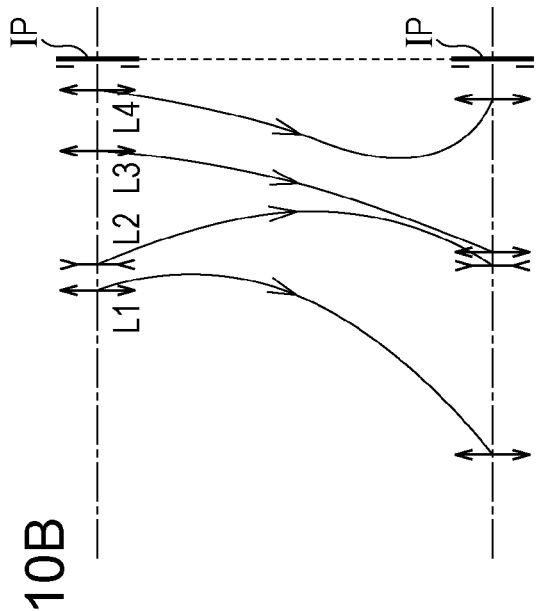
FIG. 10 illustrates movement loci of the lens unit in the zoom lens system according to the present invention resulting from zooming.
Figure 10D:
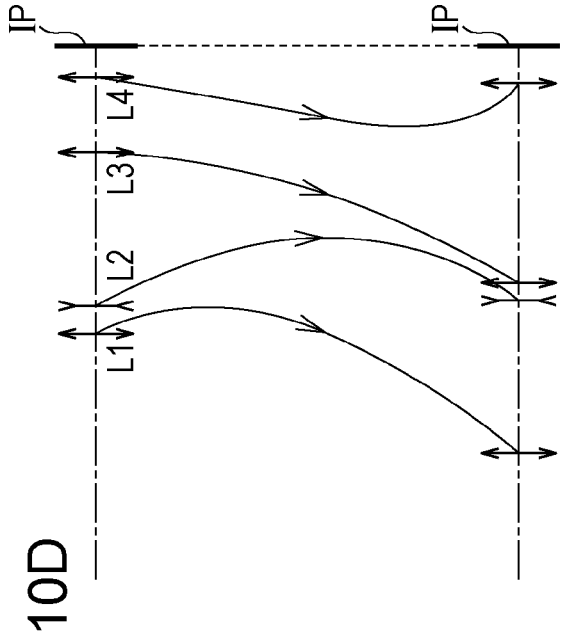
Figure 10A:
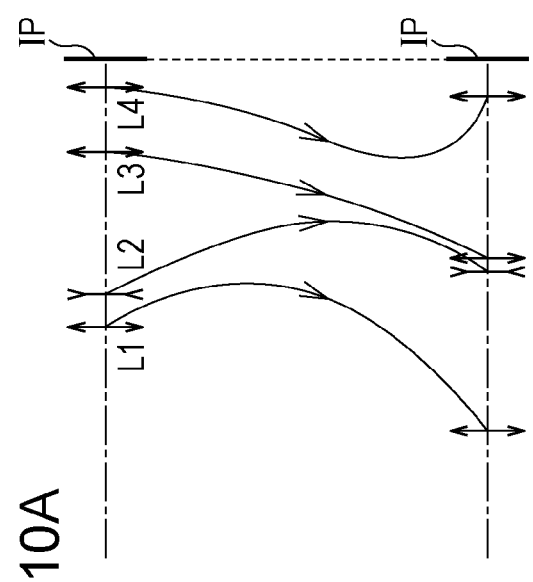
Figure 10C:
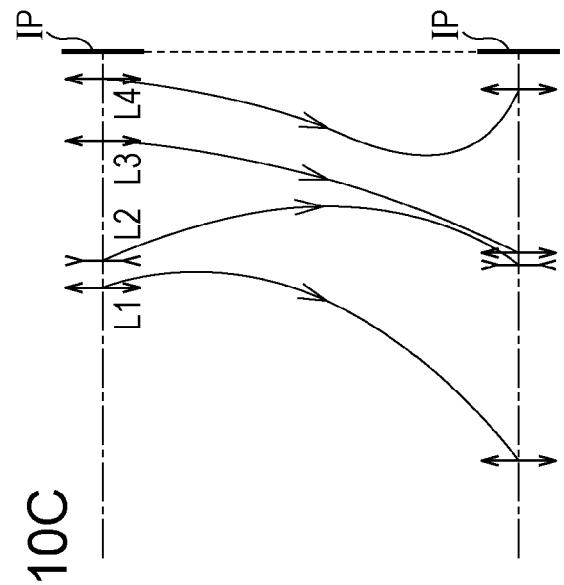

FIG. 9 is a schematic view of a camera (image pickup apparatus) including a zoom lens system according to the present invention. FIGS. 10A, 10B, 10C, and 10D, respectively, illustrate the movement loci of the lens units according to the first, second, third, and fourth embodiments as a result of zooming. The zoom lens system according to each embodiment is an imaging optical system used in an image pickup apparatus, such as video camera, a digital camera, a silver-halide film camera, or the like. In the sectional views, the left side is the object side (front), and the right size is the image side (rear) of the image pickup apparatus. In the sectional views, i (where i=1, 2, 3 . . . ) represents the order of the lens units counted from the object side to the image side, and Li represents an ith lens unit. In the sectional views, L1 represents the first lens unit having positive refractive power (optical power=inverse of focal length), L2 represents the second lens unit having negative refractive power, L3 represents the third lens unit having positive refractive power, and L4 represents the fourth lens unit having positive refractive power.

SP represents an aperture stop. The aperture stop SP is positioned between the object-side vertex of a positive lens element G31 of the third lens unit L3, which is disposed furthest on the object side, and the intersection of the object-side lens surface of the positive lens element G31 and the outer area (edge section). G represents an optical block equivalent to an optical filter, a face plate, an optical low-pass filter, an infrared cut filter, or the like. IP represents an image plane, which, when the zoom lens system is used as an imaging optical system of a video camera or a still camera, is a solid-state image pickup element (photoelectric conversion element), such as a CCD sensor or a CMOS sensor. In the spherical aberration diagrams, the solid line represents the d-line, and the dashed double-dotted line represents the g-line. In the astigmatism diagrams, the dotted line represents the meridional image plane, and the solid line represents the sagittal image plane. Lateral chromatic aberration is represented by the g-line. Omega (ω) represents the half angle of view (half the imaging angle of view). In each of the first to fourth embodiments, as described below, the wide-angle end and the telephoto end are zooming positions at the ends of the movable distance of magnifying lens units (second lens unit L2 and third lens unit L3) on the optical axis of the mechanism.

In each embodiment, as indicated by arrows and as illustrated in FIGS. 10A, 10B, 10C, and 10D, the lens units move from the wide-angle end to the telephoto end. The interval between the first lens unit L1 and the second lens unit L2 increases monotonically during zooming from the wide-angle end to the telephoto end. The interval between the second lens unit L2 and the third lens unit L3 gradually decreases from the wide-angle end to an intermediate zooming position and is minimized at a zooming position near the telephoto end. The interval between the third lens unit L3 and the fourth lens unit L4 once decreases as a result of zooming from the wide-angle end towards the telephoto end, is minimized at a zooming position near the wide-angle end, and then increases.

Specifically, in each embodiment, the first lens unit L1 moves along a locus convex toward the image side during zooming from the wide-angle end to the telephoto end. The second lens unit L2 moves along a locus convex toward the image side. The third lens unit L3 moves toward the object side. The fourth lens unit L4 moves along a locus convex toward the object side. Rear focusing in which focusing is carried out by moving the fourth lens unit L4 along the optical axis is employed. To carry out focusing at the telephoto end from an object at infinity to a near object, the fourth lens unit L4 moves forward as indicated by arrow 4c. The solid curved line 4a and the dotted curved line 4b of the fourth lens unit L4 represent movement loci for correcting image plane variation as a result of zooming from the wide-angle end to the telephoto end while focusing on an object at infinity and a near object, respectively.

In each embodiment, fast focusing is achieved by moving the small and light fourth lens unit L4. This facilitates, for example, automatic detection of a focal point. In each embodiment, image blur caused by shaking of the entire optical system is corrected by displacing the image in a direction orthogonal to the optical axis by moving part or all of the third lens unit L3 such that the movement has a component orthogonal to the optical axis. In other words, the position of the captured image is corrected. In this manner, image stabilization is possible without adding an optical member, such as a variable angle prism, or a new lens unit for image stabilization. Accordingly, an increase in the size of the entire optical system is prevented. In each embodiment, the aperture stop SP moves together with the third lens unit L3 during zooming.

In this way, the number of lens units that move in different directions is reduced, and thus the structure of the mechanism is simplified.

In the zoom lens system according to each embodiment, the first lens unit L1 consists of a negative first-a lens element G11 (having negative refractive power) and a positive first-b lens element G12 (having positive refractive power). The second lens unit L2 consists of a negative second-a lens element G21, a negative second-b lens element G22, and a positive second-c lens element G23. The refractive index and Abbe number of the material of the positive first-b lens element G12 are n12 and v12, respectively. The focal length at the wide-angle end and the telephoto end are fw and ft, respectively. Here, the following conditions are satisfied:

$$7.5 < ft/fw < 13.0, \tag{1}$$

$$n12 > -0.0013v12 + 1.63, \tag{2}$$

and $$v12 > 65. \tag{3}$$

To configure the first lens unit L1 such that it consists of two lens elements, i.e., a negative lens element and a positive lens element, the positive lens element included in the first lens unit L1 should have a relatively large refractive power. For this reason, it is desirable that material having a large refractive index be used for the positive lens element of the first lens unit L1 in order to prevent an increase in the front-lens effective diameter while minimizing the variation in aberration. However, a larger refractive index of the lens element makes it difficult to correct longitudinal chromatic aberration in the telephoto range because when a desired zoom ratio is to be achieved, dispersion increases too much. Therefore, the first lens unit L1 according to each embodiment consists of two lens elements, i.e., a negative lens element and a positive lens element, and the characteristics of the material of the positive first-b lens element G12 are set to satisfy Conditional Expressions 2 and 3.

The technical significance of these conditional expressions will be described below. Conditional Expression 1 represents a desired magnification for the present invention and should be satisfied simultaneously with Conditional Expressions 2 and 3. When the zoom ratio increases such that the upper limit of Conditional Expression 1 is exceeded, it becomes difficult to satisfactorily correct aberration in all zoom ranges with the lens configuration according to each embodiment. It is undesirable for the zoom ratio to decrease such that the lower limit of the Conditional Expression 1 is not reached because a desired zoom ratio will not be achieved and an optimal lens configuration will not be acquired.

The Conditional Expression 2 relates to the characteristic of the material used for the first-b lens element G12. It is undesirable for the refractive index of the positive first-b lens element G12 to be too small to satisfy Conditional Expression 2 because the curvature of the lens surface of the first-b lens element G12 will increase, causing an increase in the lens thickness for ensuring appropriate edge thickness and an increase in the front-lens effective diameter. Conditional Expression 3 relates to the Abbe number of the positive first-b lens element G12. When the Abbe number of material of the first-b lens element G12 is too small to satisfy Conditional Expression 3, it is difficult to correct the longitudinal chromatic aberration in the telephoto range while ensuring a desired zoom ratio.

In each embodiment, it is preferable to set the range of the numerical values of Conditional Expressions 1 to 3 as follows:

$$7.6 < ft/fw < 10.0, \tag{1a}$$

$$-0.0013v12 + 1.71 > n12 > -0.0013v12 + 1.66, \tag{2a}$$

and $$70 > v12 > 67. \tag{3a}$$

The lens units according to each embodiment have a simple and compact configuration, have a large zoom ratio of approximately 8 to 10, and achieve excellent optical performance in all zoom ranges. Furthermore, the lens units included in the zoom lens system each have a small number of lens elements and can be retracted into a small space.

According to the present invention, it is more desirable to satisfy at least one of the following conditions. In zooming from the wide-angle end to the telephoto end, the displacement of the first lens unit L1 in the optical axis direction is represented by M1. Here, the displacement M1 is determined by comparing the positions of the first lens unit L1 at the wide-angle end and the telephoto end. The displacement M1 is positive when the movement is toward the image side at the telephoto end with respect to the wide-angle end and is negative when the movement is toward the object side at the telephoto end with respect to the wide-angle end. The focal length of the first lens unit L1 is represented by f1. Here, it is desirable that at least one of the following conditional expressions be satisfied:

$$2.5 < M1/fw < 7.0 \tag{4}$$

and $$1.0 < f1/ft < 1.5. \tag{5}$$

In each embodiment, to acquire desired imaging angle of view and zoom ratio while reducing the size of the entire lens system, it is effective to employ the above-described configuration of the first lens unit L1 and appropriately set the displacement and refractive power of the first lens unit L1 for zooming. Conditional Expressions 4 and 5 represent conditions related to this. Conditional Expression 4 normalizes the displacement of the first lens unit L1 as a result of zooming from the wide-angle end to the telephoto end in the optical axis direction on the basis of the focal length of the entire system at the wide-angle end. It is undesirable for the displacement of the first lens unit L1 to increase such that the upper limit of Conditional Expression 4 is exceeded because the total length of the lens system at the telephoto end increases. It is undesirable for the displacement of the first lens unit L1 to decrease too much such that the lower limit of the Conditional Expression 4 is not reached because the total length of the lens system increases at the wide-angle end, and the front-lens effective diameter increases.

Conditional Expression 5 normalizes the focal length of the first lens unit L1 on the basis of the focal length at the telephoto end. When the power of the first lens unit L1 increases too much such that the lower limit of Conditional Expression 5 is not reached, it is difficult to suppress fluctuation in coma aberration caused by zooming. It is undesirable for the power of the first lens unit L1 to decrease too much such that the lower limit of Conditional Expression 5 is not reached because the total length of the lens system and the front-lens effective diameter increase. In each embodiment, it is preferable to set the range of the numerical values of Conditional Expressions 4 and 5 as follows:

$$2.7 < M1/fw < 6.0 \quad (4a)$$

and $$1.1 < f1/ft < 1.4. \quad (5a)$$

Next, the lens configuration of each lens unit will be described. The lens elements in each lens unit are disposed in order from the object side to the image side. The first lens unit L1 consists of a cemented lens formed by cementing the negative first-a lens element G11 having a convex and meniscus object-side surface and the positive first-b lens element G12 having a convex object-side surface. The first-a lens element G11 and the first-b lens element G12 may be separated. In this way, the fluctuation in chromatic aberration during zooming can be alleviated. For the first lens unit L1 to employ a two-lens configuration and to satisfactorily correct chromatic aberration in the telephoto range, it is effective to select a material that has low dispersion and a large Abbe number for the first-b lens element G12. In each embodiment, to achieve a small front-lens effective diameter, a low-dispersion material having a relatively large refractive index is used.

The second lens unit L2 consists of the negative second-a lens element G21 having a concave image-side surface, the negative second-b lens element G22 of which both lens surfaces are concave, and the positive second-c lens element G23 having a convex object-side surface. By making at least one of the surfaces of the second-b lens element G22 and the second-c lens element G23 an aspheric surface, aberration can be satisfactorily corrected even when the refractive power of the second lens unit L2 is increased, and an increase in the front-lens effective diameter is prevented.

The third lens unit L3 consists of a positive lens element, a positive lens element, and a negative lens element. Specifically, the third lens unit L3 consists of the positive third-a lens element G31 of which both lens surfaces are convex, a positive third-b lens element G32, whose object-side surface is convex and meniscus, and a negative third-c lens element, whose object-side surface is convex and meniscus. The third-b lens element G32 and the third-c lens element G33 are cemented. By making the object-side surface of the third-a lens element G31 an aspheric surface, the refractive power of the third lens unit L3 is increased and the displacement of the third lens unit L3 during zooming is decreased while reducing the fluctuation in aberration during zooming. The fourth lens unit L4 consists of a single positive fourth-a lens element G41.

According to each embodiment described above, the lens configuration of the lens units, the positions of the aspheric surfaces, the moving method of zooming, material selection, and so on are optimized. In this way, a zoom lens system having a zoom ratio of approximately 8 to 10 and excellent optical performance and thus being suitable for digital still cameras, video cameras, and so on is acquired with the advantage that the number of lens elements and the total length of the lens system are reduced.

FIG. 10 illustrates a digital still camera, as an example of an image pickup apparatus, according to another embodiment of the present invention. The image pickup apparatus of FIG. 9 includes a zoom lens system according to any of the embodiments described above as an imaging optical system. More specifically, FIG. 9 illustrates a camera main body 20 and an imaging optical system 21 including a zoom lens system according to one of the first to fourth embodiments. A solid-state image pickup element (photoelectric conversion element) 22, such as a CCD sensor or a CMOS sensor, receives a subject image formed by the imaging optical system 21. A memory 23 records information corresponding to the subject image photoelectrically converted at the solid-state image pickup element 22. A viewfinder 24 includes a liquid crystal display and allows viewing of the subject image formed on the solid-state image pickup element 22. Advantageously, by using the zoom lens system according to the present invention in an image pickup apparatus, such as a digital still camera, a small image pickup apparatus having excellent optical performance and reduced size can be realized.

Next, numerical data for first to fourth numerical embodiments respectively corresponding to the first to fourth embodiments of present invention the will be listed below. In each numerical embodiment, i represents the order of optical surfaces counted from the object side towards the image side; ri represents the radius of curvature of the ith optical surface (ith surface); di represents the interval between the ith surface and the i+1th surface; and ndi and vdi represent the refractive index and Abbe number, respectively, of the material of the ith optical member with respect to the d-line. Where a given surface is aspheric, the aspheric surface is indicated by an asterisk (*). The shape of the aspheric surface can be represented as:

$$X = \frac{(h^2/R)}{1 + \sqrt{1 - (1+k)(h/R)^2}} + A4h^4 + A6h^6 + A8h^8 + A10h^{10}$$

where, k represents eccentricity, A4, A6, A8, and A10 represent coefficients of the aspheric surfaces, and X represents displacement in the optical axis direction at a height h from the optical axis with respect to the surface vertex. R represents the radius of curvature. The mathematical representation "e-Z" is equivalent to $1 \times 10^{-Z}$. In each numerical embodiment, the last two surfaces are surfaces of an optical block, such as a filter or a faceplate. In each numerical embodiment, d10 is a negative value because the aperture stop and the positive lens element of the third lens unit disposed furthest on the object side are counted from the object side to the image side. In each embodiment, the back focus BF represents the length in air from the final lens surface to the paraxial image plane. The total length of the lens system is the sum of the length from the lens surface furthest on the object side to the final lens surface and the back focus. Table 1 shows the correspondence between the numerical embodiments and the above-described Conditional Expressions.

| First Numerical Embodiment Unit: mm | | | | |
|---|---|---|---|---|
| Surface Data | | | | |
| Surface Number | r | d | nd | vd |
| 1 | 19.606 | 0.90 | 1.84666 | 23.9 |
| 2 | 16.244 | 3.40 | 1.59282 | 68.6 |
| 3 | 75.577 | (Variable) | | |
| 4 | 46.419 | 0.70 | 1.88300 | 40.8 |
| 5 | 6.927 | 3.23 | | |
| 6 | −26.009 | 0.55 | 1.84862 | 40.0 |
| 7* | 25.790 | 0.23 | | |
| 8* | 12.089 | 1.40 | 2.00178 | 19.3 |
| 9 | 46.536 | (Variable) | | |
| 10(Aperture) | ∞ | −0.35 | | |

First Numerical Embodiment
Unit: mm

| | | | | |
|---|---|---|---|---|
| 11* | 7.830 | 2.10 | 1.58313 | 59.4 |
| 12* | −16.380 | 0.20 | | |
| 13 | 4.389 | 1.40 | 1.69680 | 55.5 |
| 14 | 8.649 | 0.50 | 2.00069 | 25.5 |
| 15 | 3.462 | (Variable) | | |
| 16 | 16.516 | 1.75 | 1.69680 | 55.5 |
| 17 | 143.428 | (Variable) | | |
| 18 | ∞ | 0.80 | 1.51633 | 64.1 |
| 19 | ∞ | 0.73 | | |
| Image Plane | ∞ | | | |

Aspheric Surface Data

Seventh Surface

$\kappa = -2.21343e+000$  $A4 = -1.57161e-005$  $A6 = 3.80314e-008$
$A8 = -6.43111e-009$

Eighth Surface

$\kappa = 1.34269e-001$  $A4 = -1.06906e-004$  $A6 = -1.67554e-006$
$A8 = 4.15566e-008$  $A10 = -6.21350e-010$

Eleventh Surface

$\kappa = -1.40922e+000$  $A4 = -7.25682e-005$  $A6 = -7.02094e-006$

Twelfth Surface

$\kappa = -1.59485e+001$  $A4 = -4.18803e-004$

Various Data
Zoom Ratio 7.71

| | Wide-angle | Intermediate | Telephoto |
|---|---|---|---|
| Focal Length | 5.12 | 17.70 | 39.50 |
| F-number | 2.95 | 4.46 | 6.08 |
| Angle of View | 34.2 | 12.4 | 5.61 |
| Image Height | 3.48 | 3.88 | 3.88 |
| Total Length of Lens System | 45.15 | 41.52 | 59.88 |
| BF | 4.26 | 12.22 | 5.58 |
| d3 | 0.40 | 7.07 | 18.31 |
| d9 | 19.26 | 2.40 | 1.00 |
| d15 | 5.22 | 3.82 | 18.98 |
| d17 | 3.00 | 10.96 | 4.32 |
| Entrance Pupil | 13.37 | 21.00 | 55.01 |
| Exit Pupil | −13.52 | −19.16 | −92.95 |
| Front Principle Point | 16.65 | 22.95 | 77.86 |
| Rear Principle Point | −4.40 | −16.97 | −38.77 |

Zoom Lens Unit Data

| Unit | Starting Surface | Focal Length | Lens Configuration Length | Front Principle Point | Rear Principle Point |
|---|---|---|---|---|---|
| 1 | 1 | 48.37 | 4.30 | −1.37 | −3.90 |
| 2 | 4 | −9.07 | 6.11 | 0.44 | −4.41 |
| 3 | 10 | 10.65 | 3.85 | −3.46 | −4.16 |
| 4 | 16 | 26.64 | 1.75 | −0.13 | −1.16 |
| 5 | 18 | ∞ | 0.80 | 0.26 | −0.26 |

Single Lens Data

| Lens | Starting Surface | Focal Length |
|---|---|---|
| 1 | 1 | −127.53 |
| 2 | 2 | 34.17 |
| 3 | 4 | −9.30 |
| 4 | 6 | −15.19 |
| 5 | 8 | 15.98 |
| 6 | 11 | 9.38 |
| 7 | 13 | 11.27 |
| 8 | 14 | −6.06 |
| 9 | 16 | 26.64 |
| 10 | 18 | 0.00 |

Second Numerical Embodiment
Unit: mm

Surface Data

| Surface Number | r | d | nd | νd |
|---|---|---|---|---|
| 1 | 23.307 | 0.90 | 1.84666 | 23.9 |
| 2 | 19.150 | 2.50 | 1.59282 | 68.6 |
| 3 | 88.514 | (Variable) | | |
| 4 | 72.335 | 0.70 | 1.88300 | 40.8 |
| 5 | 7.175 | 3.06 | | |
| 6 | −23.549 | 0.55 | 1.76753 | 49.3 |
| 7* | 27.562 | 0.23 | | |
| 8* | 12.089 | 1.40 | 2.00178 | 19.3 |
| 9 | 39.530 | (Variable) | | |
| 10(Aperture) | ∞ | −0.35 | | |
| 11* | 7.830 | 2.10 | 1.59201 | 67.0 |
| 12* | −16.380 | 0.20 | | |
| 13 | 4.377 | 1.40 | 1.69680 | 55.5 |
| 14 | 8.162 | 0.50 | 2.00069 | 25.5 |
| 15 | 3.441 | (Variable) | | |
| 16 | 14.841 | 1.60 | 1.69680 | 55.5 |
| 17 | 85.847 | (Variable) | | |
| 18 | ∞ | 0.80 | 1.51633 | 64.1 |
| 19 | ∞ | 0.91 | | |
| Image Plane | ∞ | | | |

Aspheric Surface Data

Seventh Surface

$\kappa = -1.57174e+001$  $A4 = 5.10466e-005$  $A6 = 4.65505e-006$
$A8 = -1.71903e-007$

Eighth Surface

$\kappa = -8.31755e-002$  $A4 = -9.60920e-005$  $A6 = 1.24049e-006$
$A8 = -5.51153e-008$  $A10 = -6.21350e-010$

Eleventh Surface

$\kappa = -1.29610e+000$  $A4 = -8.95252e-005$  $A6 = -5.51173e-006$

Twelfth Surface

$\kappa = -1.46404e+001$  $A4 = -3.52317e-004$

Various Data
Zoom Ratio 8.62

| | Wide-angle | Intermediate | Telephoto |
|---|---|---|---|
| Focal Length | 5.12 | 19.28 | 44.13 |
| F-number | 2.87 | 4.37 | 6.08 |
| Angle of View | 34.2 | 11.4 | 5.02 |
| Image Height | 3.48 | 3.88 | 3.88 |
| Total Length of Lens System | 42.19 | 45.87 | 68.31 |
| BF | 3.94 | 12.75 | 5.34 |
| d3 | 0.40 | 12.68 | 26.54 |
| d9 | 17.22 | 1.85 | 1.00 |
| d15 | 5.84 | 3.80 | 20.64 |
| d17 | 2.50 | 11.31 | 3.90 |
| Entrance Pupil | 11.33 | 28.89 | 76.27 |
| Exit Pupil | −14.17 | −19.42 | −164.53 |
| Front Principle Point | 14.71 | 29.89 | 108.63 |
| Rear Principle Point | −4.20 | −18.37 | −43.21 |

Zoom Lens Unit Data

| Unit | Starting Surface | Focal Length | Lens Configuration Length | Front Principle Point | Rear Principle Point |
|---|---|---|---|---|---|
| 1 | 1 | 58.92 | 3.40 | −1.20 | −3.20 |
| 2 | 4 | −8.97 | 5.94 | 0.40 | −4.28 |
| 3 | 10 | 10.31 | 3.85 | −3.34 | −4.07 |
| 4 | 16 | 25.51 | 1.60 | −0.20 | −1.13 |
| 5 | 18 | ∞ | 0.80 | 0.26 | −0.26 |

Second Numerical Embodiment
Unit: mm

Single Lens Data

| Lens | Starting Surface | Focal Length |
|---|---|---|
| 1 | 1 | −140.78 |
| 2 | 2 | 40.68 |
| 3 | 4 | −9.07 |
| 4 | 6 | −16.47 |
| 5 | 8 | 16.95 |
| 6 | 11 | 9.25 |
| 7 | 13 | 11.76 |
| 8 | 14 | −6.28 |
| 9 | 16 | 25.51 |
| 10 | 18 | 0.00 |

Third Numerical Embodiment
Unit: mm

Surface Data

| Surface Number | r | d | nd | vd |
|---|---|---|---|---|
| 1 | 23.862 | 0.90 | 1.84666 | 23.9 |
| 2 | 19.232 | 3.10 | 1.59282 | 68.6 |
| 3 | 106.625 | (Variable) | | |
| 4 | 75.801 | 0.70 | 1.88300 | 40.8 |
| 5 | 7.289 | 2.84 | | |
| 6 | −18.934 | 0.55 | 1.76753 | 49.3 |
| 7* | 27.562 | 0.23 | | |
| 8* | 12.089 | 1.40 | 2.00178 | 19.3 |
| 9 | 49.934 | (Variable) | | |
| 10(Aperture) | ∞ | −0.35 | | |
| 11* | 7.830 | 2.10 | 1.59201 | 67.0 |
| 12* | −16.380 | 0.20 | | |
| 13 | 4.207 | 1.40 | 1.60311 | 60.6 |
| 14 | 7.573 | 0.50 | 2.00069 | 25.5 |
| 15 | 3.471 | (Variable) | | |
| 16 | 15.400 | 1.75 | 1.69680 | 55.5 |
| 17 | 79.588 | (Variable) | | |
| 18 | ∞ | 0.50 | 1.51633 | 64.1 |
| 19 | ∞ | 1.34 | | |
| Image Plane | ∞ | | | |

Aspheric Surface Data

Seventh Surface $\kappa = -4.62874e+001$  $A4 = 1.76212e-005$  $A6 = 1.92866e-006$
$A8 = 3.85142e-009$ Eighth Surface $\kappa = -1.23639e+000$  $A4 = -1.90246e-004$  $A6 = 4.39423e-006$
$A8 = -2.05897e-008$  $A10 = -6.21350e-010$ Eleventh Surface $\kappa = -1.58151e+000$  $A4 = -2.89590e-005$  $A6 = -5.61142e-006$ Twelfth Surface $\kappa = -1.60851e+001$  $A4 = -3.76595e-004$

Various Data
Zoom Ratio 9.59

| | Wide-angle | Intermediate | Telephoto |
|---|---|---|---|
| Focal Length | 5.13 | 20.25 | 49.19 |
| F-number | 2.79 | 4.34 | 6.08 |
| Angle of View | 34.2 | 10.8 | 4.50 |
| Image Height | 3.48 | 3.88 | 3.88 |
| Total Length of Lens System | 43.90 | 47.82 | 71.14 |
| BF | 4.14 | 13.48 | 5.82 |
| d3 | 0.40 | 12.91 | 27.01 |
| d9 | 18.23 | 2.37 | 1.17 |
| d15 | 5.81 | 3.74 | 21.81 |
| d17 | 2.47 | 11.81 | 4.15 |
| Entrance Pupil | 11.95 | 30.80 | 82.83 |
| Exit Pupil | −13.78 | −19.66 | −164.45 |
| Front Principle Point | 15.33 | 31.51 | 117.42 |
| Rear Principle Point | −3.79 | −18.92 | −47.86 |

Zoom Lens Unit Data

| Unit | Starting Surface | Focal Length | Lens Configuration Length | Front Principle Point | Rear Principle Point |
|---|---|---|---|---|---|
| 1 | 1 | 57.83 | 4.00 | −1.16 | −3.53 |
| 2 | 4 | −8.87 | 5.73 | 0.40 | −4.08 |
| 3 | 10 | 10.57 | 3.85 | −3.40 | −4.16 |
| 4 | 16 | 27.10 | 1.75 | −0.24 | −1.26 |
| 5 | 18 | ∞ | 0.50 | 0.16 | −0.16 |

Single Lens Data

| Lens | Starting Surface | Focal Length |
|---|---|---|
| 1 | 1 | −128.54 |
| 2 | 2 | 39.07 |
| 3 | 4 | −9.18 |
| 4 | 6 | −14.55 |
| 5 | 8 | 15.63 |
| 6 | 11 | 9.25 |
| 7 | 13 | 13.57 |
| 8 | 14 | −6.82 |
| 9 | 16 | 27.10 |
| 10 | 18 | 0.00 |

Fourth Numerical Embodiment
Unit: mm

Surface Data

| Surface Number | r | d | nd | vd |
|---|---|---|---|---|
| 1 | 17.962 | 0.90 | 1.84666 | 23.9 |
| 2 | 15.006 | 2.70 | 1.59201 | 67.0 |
| 3 | 93.070 | (Variable) | | |
| 4 | −517.785 | 0.70 | 1.88300 | 40.8 |
| 5 | 6.397 | 2.72 | | |
| 6 | −142.266 | 0.55 | 1.76753 | 49.3 |
| 7* | 25.790 | 0.30 | | |
| 8 | 13.077 | 1.30 | 1.94595 | 18.0 |
| 9 | 40.611 | (Variable) | | |
| 10(Aperture) | ∞ | −0.30 | | |
| 11* | 7.830 | 1.60 | 1.55332 | 71.7 |
| 12* | −16.380 | 0.20 | | |
| 13 | 3.789 | 1.30 | 1.60311 | 60.6 |
| 14 | 6.413 | 0.50 | 2.00069 | 25.5 |
| 15 | 3.190 | (Variable) | | |
| 16 | 14.551 | 1.70 | 1.69680 | 55.5 |
| 17 | 127.295 | (Variable) | | |
| 18 | ∞ | 0.80 | 1.51633 | 64.1 |
| 19 | ∞ | 0.50 | | |
| Image Plane | ∞ | | | |

Aspheric Surface Data

Seventh Surface $\kappa = -7.49412e+000$  $A4 = -1.81694e-005$  $A6 = -3.69008e-006$
$A8 = 1.08496e-007$  $A10 = -4.71719e-009$ -continued Fourth Numerical Embodiment
Unit: mm Eleventh Surface κ = −1.48671e+000  A4 = 5.14868e−005  A6 = −7.59365e−006

Twelfth Surface

κ = 8.75388e+000  A4 = 4.36212e−004

Various Data
Zoom Ratio 7.71

|  | Wide-angle | Intermediate | Telephoto |
| --- | --- | --- | --- |
| Focal Length | 5.13 | 18.02 | 39.50 |
| F-number | 3.41 | 4.77 | 7.05 |
| Angle of View | 34.2 | 12.1 | 5.60 |
| Image Height | 3.48 | 3.88 | 3.88 |
| Total Length of Lens System | 42.99 | 44.01 | 57.80 |
| BF | 4.80 | 10.30 | 5.58 |
| d3 | 0.48 | 10.07 | 15.95 |
| d9 | 18.09 | 3.28 | 1.15 |
| d15 | 5.44 | 6.18 | 20.96 |
| d17 | 3.77 | 9.27 | 4.55 |
| Entrance Pupil | 11.75 | 28.81 | 48.94 |
| Exit Pupil | −14.80 | −21.82 | −436.32 |
| Front Principle Point | 15.16 | 32.29 | 84.87 |
| Rear Principle Point | −4.62 | −17.51 | −39.00 |

Zoom Lens Unit Data

| Unit | Starting Surface | Focal Length | Lens Configuration Length | Front Principle Point | Rear Principle Point |
| --- | --- | --- | --- | --- | --- |
| 1 | 1 | 40.53 | 3.60 | −0.90 | −3.03 |
| 2 | 4 | −8.46 | 5.57 | −0.03 | −4.55 |
| 3 | 10 | 10.97 | 3.30 | −3.45 | −4.01 |
| 4 | 16 | 23.43 | 1.70 | −0.13 | −1.12 |
| 5 | 18 | ∞ | 0.80 | 0.26 | −0.26 |

Single Lens Data

| Lens | Starting Surface | Focal Length |
| --- | --- | --- |
| 1 | 1 | −125.21 |
| 2 | 2 | 29.84 |
| 3 | 4 | −7.15 |
| 4 | 6 | −28.40 |
| 5 | 8 | 19.93 |
| 6 | 11 | 9.80 |
| 7 | 13 | 12.94 |
| 8 | 14 | −6.88 |
| 9 | 16 | 23.43 |
| 10 | 18 | 0.00 |

TABLE 1

Conditional Expressions

| Embodiments | 1 ft/fw | 2 −0.0013v12 + 1.63 − 12n | 3 v12 | 4 M1/fw | 5 f1/ft |
| --- | --- | --- | --- | --- | --- |
| 1 | 7.71 | −0.052 | 68.63 | 2.87 | 1.22 |
| 2 | 8.62 | −0.052 | 68.63 | 5.10 | 1.34 |
| 3 | 9.60 | −0.052 | 68.63 | 5.70 | 1.18 |
| 4 | 7.71 | −0.049 | 67.02 | 2.89 | 1.03 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-260831 filed Nov. 16, 2009, which is hereby incorporated by reference herein in its entirety.

What is claimed is:

1. A zoom lens system comprising:
a first lens unit having a positive refractive power;
a second lens unit having a negative refractive power;
a third lens unit having a positive refractive power; and
a fourth lens unit having a positive refractive power,
wherein the first, second, third, and fourth lens units are arranged along an optical axis in order from the object side to the image side, and the lens units move along the optical axis from a wide-angle end to a telephoto end such that intervals between adjacent lens units vary during zooming,
wherein the first lens unit consists of an first-a lens element having a negative power and a first-b lens element having a positive refractive power, and the second lens unit consists of a second-a lens element having a negative refractive power, a second-b lens element having a negative refractive power, and a second-c lens element having a positive refractive power, and
wherein $7.5 < ft/fw < 13.0$, $n12 > −0.0013v12 + 1.63$, and $v12 > 65$ are satisfied, where n12 and v12 respectively represent the refractive index and the Abbe number of the first-b lens element, and fw and ft respectively present the focal length at the wide-angle end and the telephoto end of the zoom lens system.

2. The zoom lens system according to claim 1, wherein $2.5 < M1/fw < 7.0$ is satisfied, where M1 represents a displacement in the optical axis direction of the first lens unit during zooming from the wide-angle end to the telephoto end.

3. The zoom lens system according to claim 1, wherein $1.0 < f1/ft < 1.5$ is satisfied, where f1 represents a focal length of the first lens unit.

4. The zoom lens system according to claim 1, wherein the third lens unit consists of a positive lens element, a positive lens element, and a negative lens element, arranged in this order from the object side to the image side.

5. The zoom lens system according to claim 1, wherein the fourth lens unit consists of a single positive lens element.

6. The zoom lens system according to claim 1, wherein the second-a lens element is a negative lens element of which the image side surface is concave, the second-b lens element is a negative lens element of which the object side surface is concave, and the second-c lens element is a positive lens element of which the object side surface is convex.

7. An image pickup apparatus comprising:
the zoom lens system according to claim 1;
a solid-state image pickup element configured to receive an image formed by the zoom lens system.

* * * * *